(12) United States Patent
Yamada et al.

(10) Patent No.: US 11,066,543 B2
(45) Date of Patent: *Jul. 20, 2021

(54) DISPERSANT ATTACHED POLYTETRAFLUOROETHYLENE PARTICLE, COMPOSITION, LAYERED MATERIAL, ELECTROPHOTOGRAPHIC PHOTORECEPTOR, PROCESS CARTRIDGE, AND IMAGE FORMING APPARATUS

(71) Applicant: FUJIFILM BUSINESS INNOVATION CORP., Tokyo (JP)

(72) Inventors: Wataru Yamada, Ebina (JP); Takahiro Nakamura, Ebina (JP); Shingo Suda, Ebina (JP); Masahiro Iwasaki, Minamiashigara (JP); Ryosuke Fujii, Minamiashigara (JP); Keisuke Kusano, Ebina (JP); Yuto Okazaki, Ebina (JP); Taisuke Fukui, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,458

(22) Filed: Sep. 11, 2019

(65) Prior Publication Data

US 2020/0002525 A1   Jan. 2, 2020

Related U.S. Application Data

(63) Continuation-in-part of application No. 16/155,082, filed on Oct. 9, 2018, now abandoned.

(30) Foreign Application Priority Data

Jun. 15, 2018 (JP) .............................. JP2018-114576
Jun. 14, 2019 (JP) .............................. JP2019-111335

(51) Int. Cl.
*C08L 33/14* (2006.01)
*C08L 27/18* (2006.01)
(Continued)

(52) U.S. Cl.
CPC ............ *C08L 33/14* (2013.01); *B32B 27/308* (2013.01); *B32B 27/322* (2013.01); *C08K 5/09* (2013.01);
(Continued)

(58) Field of Classification Search
CPC combination set(s) only.
See application file for complete search history.

(56) References Cited

U.S. PATENT DOCUMENTS 4,863,823 A * 9/1989 Hiro .................. G03G 5/14726
430/58.15
5,164,426 A * 11/1992 Shimizu ................ C08F 259/08
523/201
(Continued)

FOREIGN PATENT DOCUMENTS

CN        105367692 A     3/2016
JP        2009-104145 A   5/2009
(Continued)

OTHER PUBLICATIONS

Apr. 23, 2019 European Search Report issued in European Patent Application No. 18201417.5.
(Continued)

*Primary Examiner* — Nicole M. Buie-Hatcher
(74) *Attorney, Agent, or Firm* — Oliff PLC

(57) ABSTRACT

A dispersant attached polytetrafluoroethylene particle on whose surface a dispersant having a fluorine atom is attached has a content of perfluorooctanoic acid of from 0 ppb to 25 ppb with respect to the polytetrafluoroethylene particle, and a composition contains a polytetrafluoroethyl-
(Continued)

ene particle and a dispersant having a fluorine atom in which a content of perfluorooctanoic acid is from 0 ppb to 25 ppb with respect to the polytetrafluoroethylene particle.

20 Claims, 2 Drawing Sheets

(51) Int. Cl.
    *G03G 5/05*     (2006.01)
    *G03G 15/06*     (2006.01)
    *C08K 5/09*     (2006.01)
    *B32B 27/32*     (2006.01)
    *B32B 27/30*     (2006.01)
    *C08L 33/26*     (2006.01)

(52) U.S. Cl.
    CPC ............... *C08L 27/18* (2013.01); *C08L 33/26* (2013.01); *G03G 5/0539* (2013.01); *G03G 15/06* (2013.01); *C08L 2207/53* (2013.01); *C08L 2312/00* (2013.01)

(56) References Cited

U.S. PATENT DOCUMENTS

| | | | |
|---|---|---|---|
| 5,637,142 A * | 6/1997 | Kubo | ............... B29C 33/58 106/285 |
| 5,955,556 A * | 9/1999 | McCarthy | ............... C08F 14/18 526/249 |
| 6,337,166 B1 | 1/2002 | Chambers et al. | |
| 9,829,813 B2 * | 11/2017 | Nukada | ................. G03G 5/0525 |
| 2007/0021551 A1 * | 1/2007 | Malvasi | ............... C08L 2666/04 524/544 |
| 2007/0292794 A1 | 12/2007 | Chen et al. | |
| 2008/0199795 A1 | 8/2008 | Ogaki et al. | |
| 2009/0130576 A1 | 5/2009 | Ogaki et al. | |
| 2013/0252151 A1 | 9/2013 | Yamamoto | |
| 2013/0252152 A1 | 9/2013 | Kawabata | |
| 2014/0072906 A1 * | 3/2014 | Iwadate | ............... G03G 5/0539 430/56 |
| 2016/0291490 A1 * | 10/2016 | Nukada | ............. G03G 5/14726 |

FOREIGN PATENT DOCUMENTS

| | | |
|---|---|---|
| JP | 5257360 B2 | 8/2013 |
| JP | 2017-090566 A | 5/2017 |

OTHER PUBLICATIONS

U.S. Appl. No. 16/155,082, filed Oct. 9, 2018 in the name of Yamada et al.

* cited by examiner

US 11,066,543 B2

DISPERSANT ATTACHED POLYTETRAFLUOROETHYLENE PARTICLE, COMPOSITION, LAYERED MATERIAL, ELECTROPHOTOGRAPHIC PHOTORECEPTOR, PROCESS CARTRIDGE, AND IMAGE FORMING APPARATUS

CROSS-REFERENCE TO RELATED APPLICATIONS

This is a continuation-in-part application of U.S. application Ser. No. 16/155,082 filed on Oct. 9, 2018, and claims priorities under 35 USC 119 from Japanese Patent Application No. 2018-114576 filed on Jun. 15, 2018 and Japanese Patent Application No. 2019-111335 filed on Jun. 14, 2019.

BACKGROUND

1. Technical Field

The present invention relates to a dispersant attached polytetrafluoroethylene particle, a composition, a layered material, an electrophotographic photoreceptor, a process cartridge, and an image forming apparatus.

2. Related Art

Polytetrafluoroethylene particles are widely utilized, for example, as a lubricant.

For example, in JP-A-2009-104145 (the term "JP-A" as used herein means an "unexamined published Japanese patent application"), an electrophotographic photoreceptor containing fluorine atom-containing resin particles in the photosensitive layer thereof is disclosed. Further, in JP-A-2009-104145 polytetrafluoroethylene particles are disclosed as the fluorine atom-containing resin particles.

On the other hand, in JP-A-2017-90566, an electrophotographic photoreceptor provided with a photosensitive layer containing a surfactant and a binder resin, wherein an amount of the surfactant is from 0.10 parts by weight to 3.00 parts by weight with respect to 100.00 parts by weight of the binder resin, a hydrophobic group of the surfactant is a perfluoroalkyl group, and the surfactant has a nonionic property is disclosed.

SUMMARY

Polytetrafluoroethylene particles are used together with a dispersant having a fluorine atom (hereinafter, also referred to as "fluorine-containing dispersant") by mixing with a component, for example, a dispersion medium or powder. However, when change in the state of the component mixed (for example, evaporation of the dispersion medium or melting of the powder) occurs, dispersibility of the polytetrafluoroethylene particles tends to decrease.

Therefore, aspects of non-limiting embodiments of the present disclosure relate to a dispersant attached polytetrafluoroethylene particle having high maintainability of dispersion state, even when the state of the component mixed changes, in comparison with the case where a content of perfluorooctanoic acid (hereinafter, also referred to as "PFOA") with respect to polytetrafluoroethylene particle (hereinafter, also referred to as "PTFE particle") exceeds 25 ppb.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a dispersant attached polytetrafluoroethylene particle on whose surface a dispersant having a fluorine atom is attached, wherein a content of perfluorooctanoic acid is from 0 ppb to 25 ppb with respect to the polytetrafluoroethylene particle.

BRIEF DESCRIPTION OF THE DRAWINGS

Exemplary embodiments of the present invention will be described in detail based on the following figures, wherein.

DESCRIPTION OF REFERENCE NUMERALS AND SIGNS

Figure 1:
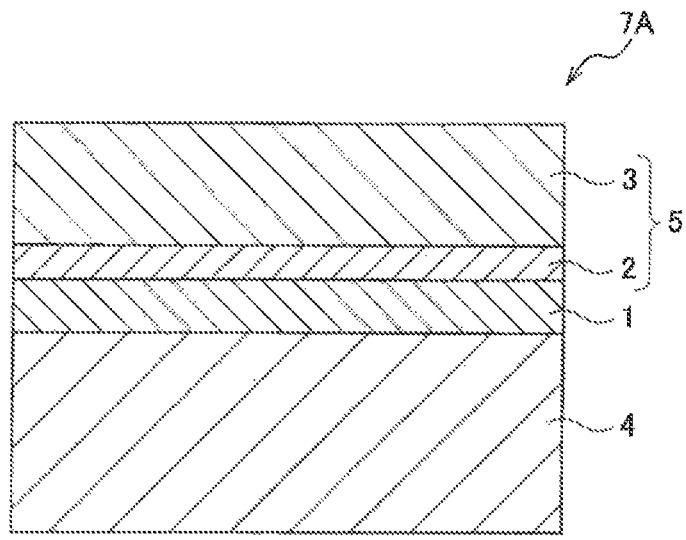
FIG. 1 is a schematic cross-sectional view illustrating one example of the layer construction of an electrophotographic photoreceptor according to the exemplary embodiment.

1: Undercoat layer, 2: Charge generation layer, 3: Charge transport layer, 4: Conductive substrate, 7a, 7: Electrophotographic photoreceptor, 8: Charging device, 9: Exposing device, 11 Developing device, 13: Cleaning device, 14: Lubricant, 40: Transfer device, 50: Intermediate transfer member, 100: Image forming apparatus, 120: Image forming apparatus, 131: Cleaning blade, 132: Fibrous member (roll shape), 133: Fibrous member (flat brush shape), 300: Process cartridge

DETAILED DESCRIPTION

Hereinafter, an exemplary embodiment which is one example of the invention will be described.

(Dispersant Attached Polytetrafluoroethylene Particle)

The dispersant attached polytetrafluoroethylene particle (dispersant attached PTFE particle) according to the exemplary embodiment is a PTFE particle on whose surface a dispersant having a fluorine atom (fluorine-containing dispersant) is attached.

In addition, in the dispersant attached PTFE particle according to the exemplary embodiment, a content of perfluorooctanoic acid (PFOA) is from 0 ppb to 25 ppb with respect to the polytetrafluoroethylene particle (PTFE particle).

The dispersant attached PTFE particle according to the exemplary embodiment has high maintainability of dispersion state, even when the state of the component mixed changes by taking the configuration described above. The reason for this is presumed to be as follows.

PTFE particles are ordinarily used together with a fluorine-containing dispersant by mixing with a component, for example, a dispersion medium or powder. However, when change in the state of the component mixed (for example, evaporation of the dispersion medium or melting of the powder) occurs, dispersibility of the polytetrafluoroethylene particles tends to decrease.

Specifically, for example, in the case of forming a layered material containing PTFE particles utilizing a liquid state composition (for example, a coating solution for forming a layer) containing a resin and a dispersion medium together with the PTFE particles and the fluorine-containing dispersant, drying of the dispersion medium is performed in the course of forming the layered material. Then, in the process of drying (that is, evaporating) the dispersion medium, dispersibility of the PTFE particles decreases to cause aggregation of the PTFE particles sometimes.

Further, for example, in the case of forming a layered material containing PTFE particles utilizing a solid state composition (for example, a powder coating) containing resin particles together with the PTFE particles and the fluorine-containing dispersant, melting of the resin occurs in the course of forming the layered material. Then, in the process of melting the resin, dispersibility of the PTFE particles decreases to cause aggregation of the PTFE particles sometimes.

As a result, a layered material having low dispersion state of the PTFE particles is formed. The reason for this is as follows.

Since PFOA is used or generated as a byproduct in the course of production of PTFE particles, the PTFE particles often contains the PFOA.

In the case where the PFOA is present, although PTFE particles are maintained in a high dispersibility state by a fluorine-containing dispersant in the state of composition, when the state of the component mixed changes, attachment state of the fluorine-containing dispersant to the PTFE particles is changed. Specifically, it is thought that due to the PFOA a part of the fluorine-containing dispersant is left from the PTFE particles. Accordingly, the dispersibility of the PTFE particles decreases to cause aggregation of the PTFE particles.

Therefore, in the dispersant attached PTFE particle according to the exemplary embodiment, the PFOA content is from 0 ppb to 25 ppb with respect to the PTFE particle. In other words, the PTFE particle does not contain the PFOA or even if the PTFE particle contains the PFOA, the PFOA content is suppressed. Thus, the change in the attachment state of the fluorine-containing dispersant to the PTFE particles which is caused by the PFOA and is generated when the state of the component mixed changes is suppressed.

From the above, it is presumed that the dispersant attached PTFE particle according to the exemplary embodiment has high maintainability of dispersion state, even when the state of the component mixed changes.

Hereinafter, the dispersant attached PTFE particle according to the exemplary embodiment will be described in detail.

The PFOA content is from 0 ppb to 25 ppb with respect to the PTFE particle, and from the standpoint of increasing maintainability of dispersion state, it is preferably from 0.01 ppb to 20 ppb, and more preferably from 0.1 ppb to 15 ppb. The "ppb" is weight basis.

The method for decreasing the PFOA content includes a method of thoroughly washing the PTFE particle with pure water, alkaline water, an alcohol (for example, methanol, ethanol or isopropanol), a ketone (for example, acetone, methyl ethyl ketone or methyl isobutyl ketone), an ester (for example, ethyl acetate), or other common organic solvents (for example, toluene or tetrahydrofuran). Although the washing may be performed at mom temperature, the PFOA content may be efficiently decreased by performing the washing under heating.

The PFOA content is a value measured by the method shown below.

—Pretreatment of Sample—

In the case of a layered material containing the dispersant attached PTFE particles, the layered material is immersed in a solvent (for example, tetrahydrofuran) to dissolve PTFE particles and substances other than those insoluble in the solvent in the solvent and then, the solution is dropwise added to pure water, and the deposit is separated by filtration. The solution containing PFOA thus-obtained is collected. Further, the insoluble substance obtained by filtration is dissolved in the solvent and then, the solution is dropwise added to pure water, and the deposit is separated by filtration. The operation of collecting the solution containing PFOA thus-obtained is repeated five times, and the aqueous solutions collected by the whole operations are referred to as an aqueous solution subjected to pretreatment.

In the case of a composition containing the dispersant attached PTFE particles, the same procedure as in the case of a layered material is performed to the composition to obtain an aqueous solution subjected to pretreatment is obtained.

In the case of the dispersant attached PTFE particles, the same procedure as in the case of a layered material is performed to the dispersant attached PTFE particles to obtain an aqueous solution subjected to pretreatment is obtained.

—Measurement—

As to the aqueous solution subjected to pretreatment obtained by the means described above, preparation of sample solution and measurement are carried out in accordance with the method shown in "Analysis of perfluorooctanesulfonic acid and (PFOS) perfluorooctanoic acid (PFOA) in environmental water, sediment and creature, Research Institute for Environmental Science and Public Health of Iwate Prefecture"

The average particle diameter of the PTFE particles (average particle diameter of the dispersant attached PTFE particles) is not particularly limited, and is preferably from 0.2 μm to 4.5 μm, and more preferably from 0.2 μm to 4 μm. The PTFE particles having the average particle diameter of 0.2 μm to 4.5 μm tend to contain much PFOA. Therefore, the PTFE particles having the average particle diameter of 0.2 μm to 4.5 μm especially tends to deteriorate the dispersion state when the state of the component mixed changes. However, by controlling the PFOA content within the range described above, even as to the PTFE particles having the average particle diameter of 0.2 μm to 4.5 μm, the maintainability of dispersion state is increased, when the state of the component mixed changes.

The average particle diameter of the PTFE particles is a value measured by the method shown below.

The maximum diameter of the fluorine resin particle (secondary particle formed by aggregation of primary particles) is measured by observing with a scanning electron microscope (SEM), for example, at a magnification of 5,000 times or higher. The measurement is carried out on 50 particles and an average value is regarded as the average particle diameter of the PTFE particles.

As the SEM, JSM-6700F manufactured by JEOL is used, and secondary electron image at an acceleration voltage of 5 kV is observed.

The fluorine-containing dispersant includes a polymer obtained by homopolymerization or copolymerization of a polymerizable compound having a fluorinated alkyl group (hereinafter, also referred to as "fluorinated alkyl group-containing polymer").

The fluorine-containing dispersant specifically includes, for example, a homopolymer of a (meth)acrylate having a fluorinated alkyl group and a random or block copolymer between a (meth)acrylate having a fluorinated alkyl group and a monomer having no fluorine atom. The (meth)acrylate means both acrylate and methacrylate.

The (meth)acrylate having a fluorinated alkyl group include, for example, 2,2,2-trifluoroethyl (meth)acrylate and 2,2,3,3,3-pentafluoropropyl (meth)acrylate.

The monomer having no fluorine atom includes, for example, (meth)acrylate, isobutyl (meth)acrylate, tert-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxytriethylene glycol (meth)acrylate, 2-ethoxyethyl (meth)acrylate, tetrahydrofurfuryl (meth)acrylate, benzyl (meth)acrylate, ethylcarbitol (meth)acrylate, phenoxyethyl (meth)acrylate, 2-hydroxy (meth)acrylate, 2-hydroxypropyl (meth)acrylate, 4-hydroxybutyl (meth)acrylate, methoxypolyethylene glycol (meth)acrylate, phenoxypolyethylene glycol (meth)acrylate, hydroxyethyl o-phenylphenol (meth)acrylate and o-phenylphenol glycidyl ether (meth)acrylate.

In addition, the fluorine-containing dispersant specifically includes, for example, block or branch polymers disclosed, for example, in U.S. Pat. No. 5,637,142 and Japanese Patent No. 4,251,662. Moreover, the fluorine-containing dispersant specifically includes fluorine-based surfactants.

Among these, as the fluorine-containing dispersant, a fluorinated alkyl group-containing polymer having a structural unit represented by formula (FA) shown below is preferred, and a fluorinated alkyl group-containing polymer having a structural unit represented by formula (FA) shown below and a structural unit represented by formula (FB) shown below is more preferred.

The fluorinated alkyl group-containing polymer having a structural unit represented by formula (FA) shown below and a structural unit represented by formula (FB) shown below is described below.

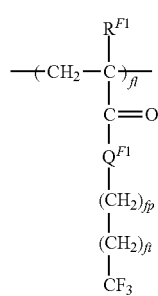
(FA)

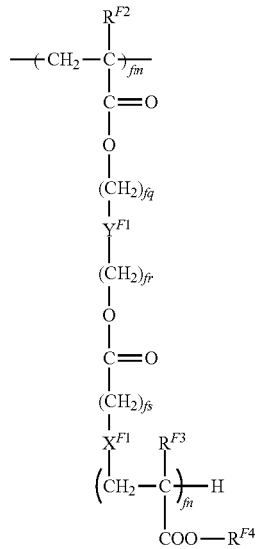

In formulae (FA) and (FB), each of $R^{F1}$, $R^{F2}$, $R^{F3}$ and $R^{F4}$ independently represents a hydrogen atom or an alkyl group.

$X^{F1}$ represents an alkylene chain, a halogen-substituted alkylene chain, —S—, —O—, —NH— or a single bond.

$Y^{F1}$ represents an alkylene chain, a halogen-substituted alkylene chain, —$C_{fx}H_{2fx-1}$(OH))— or a single bond.

$Q^{F1}$ represents —O— or —NH—.

Each of fl, fm and fn independently represents an integer of 1 or more.

Each of fp, fq, fr and fs independently represents 0 or an integer of 1 or more.

ft represents an integer of 1 to 7.

fx represents an integer of 1 or more.

The group represented by each of $R^{F1}$, $R^{F2}$, $R^{F3}$ and $R^{F4}$ in formulae (FA) and (FB) is preferably a hydrogen atom, a methyl group, an ethyl group or a propyl group, more preferably a hydrogen atom or a methyl group, and still more preferably a methyl group.

The alkylene chain (unsubstituted alkylene chain or halogen-substituted alkylene chain) represented by each of $X^{F1}$ and $Y^{F1}$ in formulae (FA) and (FB) is preferably a straight-chain or branched alkyl chain having from 1 to 10 carbon atoms.

fx in —$C_{fx}H_{2fx-1}$(OH))— represented by $Y^{F1}$ is preferably an integer of 1 to 10.

Each of fp, fq, fr and fs independently represents preferably 0 or an integer of 1 to 10.

fn is, for example, preferably from 1 to 60.

Here, in the fluorine-containing dispersant, a ratio of the structural unit represented by formula (FA) and the structural unit represented by formula (FB), in other words, fl:fm is preferably in the range from 1:9 to 9:1, and more preferably in the range from 3:7 to 7:3.

Further, the fluorine-containing dispersant may further contain a structural unit represented by formula (FC) in addition to the structural unit represented by formula (FA) and the structural unit represented by formula (FB). The content ratio of the structural unit represented by formula (FC) with respect to the total of the structural unit represented by formula (FA) and the structural unit represented by formula (FB), that is, fl+fm, is preferably in the range from 10:0 to 7:3, and more preferably in the range from 9:1 to 7:3, in a ratio (fl+fm:fz).

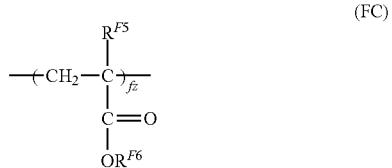

(FC)

In formula (FC), each of $R^{F5}$ and $R^{F6}$ independently represents a hydrogen atom or an alkyl group.

fz represents an integer of 1 or more.

The group represented by each of $R^{F5}$ and $R^{F6}$ in formula (FC) is preferably a hydrogen atom, a methyl group, an ethyl group or a propyl group, more preferably a hydrogen atom or a methyl group, and still more preferably a methyl group.

Commercially available products of the fluorine-containing dispersant include, for example, GF300 and GF400 (manufactured by Toagosei Co., Ltd.), Surflon series (AGC Seimi Chemical Co., Ltd.), Futargent series (manufactured by NEOS Co., Ltd.), PF series (manufactured by Kitamura Chemicals Co., Ltd.), Megafac series (manufactured by DIC Corp.) and FC series (manufactured by 3M Co.).

The weight average molecular weight of the fluorine-containing dispersant is, for example, preferably from 2,000 to 250,000, more preferably from 3,000 to 150,000, and still more preferably from 50,000 to 100,000.

The weight average molecular weight of the fluorine-containing dispersant is a value measured by gel permeation chromatography (GPC). The measurement of molecular weight by GPC is performed, for example, using as a measurement apparatus, HLC-8120GPC manufactured by Tosoh Corp., as columns, TSKgel GMHHR-M+TSKgel GMHHR-M (7.8 mm I.D. 30 cm) manufactured by Tosoh Corp., and as a solvent, chloroform. The weight average molecular weight (Mw) is calculated from the measurement result by using a molecular weight calibration curve prepared using a monodisperse polystyrene standard sample.

The content of the fluorine-containing dispersant is, for example, preferably from 0.5% by weight to 10% by weight, and more preferably from 1% by weight to 7% by weight with respect to the PTFE particle.

The fluorine-containing dispersants may be used one kind alone or two or more kinds in combination.

A method for producing the dispersant attached PTFE particle according to the exemplary embodiment includes, for example, (1) Method in which PTFE particles and a fluorine-containing dispersant are blended into a dispersing medium to prepare a dispersion liquid of PTFE particles, and then the dispersion medium is removed from the dispersion liquid;

(2) Method in which PTFE particles and a fluorine-containing dispersant are mixed using a dry powder mixing machine to attach the fluorine-containing dispersant to the PTFE particles;

(3) Method in which a fluorine-containing dispersant dissolved in a solvent is dropwise added to PTFE particles with stirring, and then the solvent is removed.

(Composition)

The composition according to the exemplary embodiment contains PTFE particles and a fluorine-containing dispersant. In addition, in the composition according to the exemplary embodiment, the PFOA content is from 0 ppb to 25 ppb with respect to the PTFE particles.

In other words, the composition according to the exemplary embodiment contains the dispersant attached PTFE particles according to the exemplary embodiment. Therefore, the composition according to the exemplary embodiment is a composition having high maintainability of dispersion state of the PTFE particles, even when the state of the component mixed with the PTFE particles changes.

However, the composition according to the exemplary embodiment may be a composition prepared by mixing the dispersant attached PTFE particle previously prepared with other components (for example, a dispersion medium or a resin particle other than the PTFE particle) or a composition in which PTFE particles, a fluorine-containing dispersant and other components (for example, a dispersion medium or a resin particle other than the PTFE particle) are mixed.

The composition according to the exemplary embodiment may be any of a liquid state composition and a solid state composition.

The liquid state composition includes, for example, a PTFE particle dispersion liquid containing PTFE particles, a fluorine-containing dispersant and a dispersion medium, and a coating solution for forming a layered material in which a resin is blended into the PTFE particle dispersion liquid.

The solid state composition includes, for example, a composition containing the dispersant attached PTFE particle, resin particles (for example, toner particles or powder coating particles).

(Layered Material)

The layered material according to the exemplary embodiment contains PTFE particles and a fluorine-containing dispersant. In addition, in the layered material according to the exemplary embodiment, the PFOA content is from 0 ppb to 25 ppb with respect to the PTFE particles.

In other words, the layered material according to the exemplary embodiment contains the dispersant attached PTFE particles. Specifically, the layered material according to the exemplary embodiment is a layer formed by the composition according to the exemplary embodiment.

Therefore, the layered material according to the exemplary embodiment is a layered material having high maintainability of dispersion state of the PTFE particles. Further, the layered material according to the exemplary embodiment is a layered material excellent in surface properties, for example, lubricity or hydrophobicity (water repellency) (in particular, a layered material having a small irregularity in the surface properties).

The layered material according to the exemplary embodiment includes, for example, an outermost surface layer of an electrophotographic photoreceptor, a toner image, a powder coating layer and a sliding layer.

In the layered material according to the exemplary embodiment, form the standpoint of exerting the surface properties described above, the content of the PTFE particle is preferably from 0.1% by weight to 40% by weight, and more preferably from 1% by weight to 30% by weight.

(Electrophotographic Photoreceptor)

The electrophotographic photoreceptor (hereinafter, also referred to as a "photoreceptor") according to the exemplary embodiment has a conductive substrate and a photosensitive layer provided on the conductive substrate, in which an outermost surface layer is a layer formed by the layered material according to the exemplary embodiment.

The outermost surface layer formed by the layered material is a charge transport layer of a lamination type photosensitive layer, a single layer type photosensitive layer, a surface protective layer or the like.

Since the photoreceptor according to the exemplary embodiment has the layer formed by the layered material according to the exemplary embodiment as the outermost surface layer, it has high abrasion resistance. In particular, a photoreceptor tends to generate image defects (specifically, streak-like image unevenness), when dispersibility of PTFE particles contained in the outermost surface layer is low. However, in the photoreceptor according to the exemplary embodiment, the image defects described above is suppressed, because the PTFE particles are contained in the state of high dispersibility in the outermost surface layer.

Hereinafter, the electrophotographic photoreceptor according to the exemplary embodiment will be described with reference to the drawing.

The electrophotographic photoreceptor 7 shown in FIG. 1 includes, for example, a photoreceptor 7 having a construction in which an undercoat layer 1, a charge generation layer 2 and a charge transport layer 3 are laminated in this order on a conductive substrate 4. The charge generation layer 2 and the charge transport layer 3 constitute a photosensitive layer 5.

Further, the electrophotographic photoreceptor 7 may have a layer configuration in which the undercoat layer 1 is omitted.

Moreover, the electrophotographic photoreceptor 7 may be a photoreceptor having a single layer type photosensitive layer in which the functions of the charge generation layer 2 and the charge transport layer 3 are integrated. In the case of the photoreceptor having a single layer type photosensitive layer, the single layer type photosensitive layer constitutes the outermost surface layer.

Furthermore, the electrophotographic photoreceptor 7 may be a photoreceptor having a surface protective layer on the charge transport layer 3 or the single layer type photosensitive layer. In the case of the photoreceptor having a surface protective layer, the surface protective layer constitutes the outermost surface layer.

Hereinafter, the respective layers of the electrophotographic photoreceptor according to the exemplary embodiment will be described in detail. In the description, reference numerals will be omitted.

(Conductive Substrate)

The conductive substrate includes, for example, a metal plate, a metal drum and a metal belt containing a metal (aluminum, copper, zinc, chromium, nickel, molybdenum, vanadium, indium, gold, platinum or the like) or an alloy (stainless steel or the like). Further, the conductive substrate includes, for example, paper, a resin film and a belt on which a conductive compound (for example, a conductive polymer or indium oxide), a metal (for example, aluminum, palladium or gold) or an alloy is coated, deposited or laminated. Here, the "conductivity" means that the volume resistivity is less than $10^{13}$ Ωcm.

For a purpose of preventing interference fringe generated at the time of irradiation with laser light, it is preferred that the surface of the conductive substrate is roughened such that the center line average roughness Ra is in the range from 0.04 μm to 0.5 μm in the case where the electrophotographic photoreceptor is used for a laser printer. Further, in the case where non-interference light is used for a light source, roughening of the surface for preventing interference fringe is not particularly necessary, but roughening of the surface is suitable for elongation of life because generation of defects due to unevenness of the surface of the conductive substrate is prevented.

The roughening method includes, for example, wet honing of suspending a polishing agent in water and blowing the suspension to a conductive substrate, centerless grinding of pressure-contacting a conductive substrate to a rotating grindstone and continuously performing a grinding process, and an anodic oxidation treatment.

The roughening method also includes a method of dispersing conductive or semi-conductive powder in a resin, forming a layer on a surface of the conductive substrate, and performing roughening using particles dispersed in the layer without roughening the surface of the conductive substrate.

The roughening treatment using anodic oxidation is a treatment of forming an oxide film on a surface of the conductive substrate using a metal (for example, made of aluminum) conductive substrate as an anode to be anodized in an electrolyte solution. The electrolyte solution includes, for example, a sulfuric acid solution and an oxalic acid solution. However, a porous anodic oxide film formed by the anodic oxidation is chemically active as it is and easily contaminated, and resistance fluctuation thereof due to the environment is large. Therefore, it is preferred that a sealing treatment of sealing the micropores of the oxide film through volume expansion using a hydration reaction in pressurized steam or boiled water (metal salt of nickel or the like may be added) and changing the oxide film into a more stable hydrated oxide is performed with respect to the porous anodic oxide film.

The film thickness of the anodic oxide film is, for example, preferably from 0.3 μm to 15 μm. When the film thickness is in the range described above, there is a tendency that a barrier property against injection is exhibited and an increase in residual potential due to repeated use is prevented.

The conductive substrate may be subjected to a treatment with an acidic treatment solution or a boehmite treatment.

The treatment with an acidic treatment solution is performed as follows. First, an acidic treatment solution containing phosphoric acid, chromic acid and hydrofluoric acid is prepared. The mixing ratio of phosphoric acid, chromic acid and hydrofluoric acid in the acidic treatment solution is phosphoric acid of 10% by weight to 11% by weight, chromic acid of 3% by weight to 5% by weight and hydrofluoric acid of 0.5% by weight to 2% by weight. Further, the concentration of the entire acids is suitably in the range from 13.5% by weight to 18% by weight. The treatment temperature is preferably from 42° C. to 48° C. The film thickness of the coating film is preferably from 0.3 μm to 15 μm.

The boehmite treatment is performed by immersing the conductive substrate in pure water at temperature from 90° C. to 100° C. for 5 minutes to 60 minutes or by bringing the conductive substrate into contact with heated steam at temperature from 90° C. to 120° C. for 5 minutes to 60 minutes. The film thickness of the coating film is preferably from 0.1 μm to 5 μm. The film may further be subjected to an anodic oxide treatment using an electrolyte solution with low coating film solubility, for example, adipic acid, boric acid, borate, phosphate, phthalate, maleate, benzoate, tartrate or citrate.

(Undercoat Layer)

The undercoat layer is, for example, a layer containing inorganic particles and a binder resin.

The inorganic particles include, for example, inorganic particles having a powder resistance (volume resistivity) of $10^2$ Ωcm to $10^{11}$ Ωcm.

Among these, as the inorganic particles having the resistance value described above, metal oxide particles, for example, tin oxide particles, titanium oxide particles, zinc oxide particles or zirconium oxide particles are preferred and zinc oxide particles are particularly preferred.

The specific surface area of the inorganic particles using a BET method is, for example, suitably 10 m²/g or more.

The volume average particle diameter of the inorganic particles is, for example, suitably from 50 nm to 2,000 nm (preferably from 60 nm to 1,000 nm).

The content of the inorganic particles is, for example, preferably from 10% by weight to 80% by weight, and more preferably from 40% by weight to 80% by weight with respect to the binder resin.

The inorganic particles may be subjected to a surface treatment. The inorganic particles may be used in combination of two or more kinds of particles which are subjected to different surface treatments or particles whose particle diameters are different from each other.

The surface treatment agent includes, for example, a silane coupling agent, a titanate coupling agent, an aluminum coupling agent and a surfactant. In particular, a silane coupling agent is preferred and a silane coupling agent having an amino group is more preferred.

The silane coupling agent having an amino group includes, for example, 3-aminopropyltriethoxysilane, N-2-(aminoethyl)-3-aminopropyltrimethoxysilane, N-2-(aminoethyl)-3-aminopropylmethyldimethoxysilane and N,N-bis(2-hydroxyethyl)-3-aminopropyltriethoxysilane, but the silane coupling agent having an amino group is not limited thereto.

The silane coupling agent may be used in combination of two or more kinds thereof. For example, a silane coupling agent having an amino group and another silane coupling agent may be combined with each other. The another silane coupling agent includes, for example, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane and 3-chloropropyltrimethoxysilane, but the another silane coupling agent is not limited thereto.

As a surface treatment method with a surface treatment agent, any method may be used as long as the method is a known method, and any of a dry method and a wet method may be used.

A treatment amount of the surface treatment agent is preferably from 0.5% by weight to 10% by weight with respect to inorganic particles.

From the standpoint of long term stability of electrical characteristics and improvement in carrier blocking property, it is preferred that an undercoat layer contain an electron accepting compound (acceptor compound) together with the inorganic particles.

The electron accepting compound includes, for example, an electron transport substance, for example, a quinone compound, for example, chloranil or bromanil; a tetracyanoquinodimethane compound; a fluorenone compound, for example, 2,4,7-trinitrofluorenone or 2,4,5,7-tetranitro-9-fluorenone; an oxadiazole compound, for example, 2-(4-biphenyl)-5-(4-tert-butylphenyl)-1,3,4-oxadiazole, 2,5-bis(4-naphthyl)-1,3,4-oxadiazole or 2,5-bis(4-diethylaminophenyl)-1,3,4-oxadiazole; a xanthone compound; a thiophene compound; a diphenoquinone compound, for example, 3,3',5,5'-tetra-tert-butyldiphenoquinone.

In particular, a compound having an anthraquinone structure is preferred as the electron accepting compound. As the compound having an anthraquinone structure, for example, a hydroxyanthraquinone compound, an aminoanthraquinone compound or an aminohydroxyanthraquinone compound is preferred, and specifically, anthraquinone, alizarin, quinizarin, anthraufin or purpurine is preferred.

The electron accepting compound may be contained in the undercoat layer in the state of being dispersed in the undercoat layer together with the inorganic particles or in the state of being attached to the surface of inorganic particles.

A method of attaching the electron accepting compound onto the surface of inorganic particles includes, for example, a dry method and a wet method.

The dry method is a method of directly dropping an electron accepting compound or dropping the electron accepting compound dissolved in an organic solvent while inorganic particles are stirred using a mixer or the like having large shearing force, spraying the electron accepting compound together with dry air or nitrogen gas, and attaching the electron accepting compound to a surface of the inorganic particles. The dropping or spraying the electron accepting compound is suitably performed at a temperature lower than or equal to the boiling point of a solvent. The electron accepting compound may further be baked at a temperature of 100° C. or higher after being dropped or sprayed. The baking is not particularly limited as long as the baking is performed under a condition of a temperature and a time period which are the same as those of the condition for which the electrophotographic characteristics may be obtained.

The wet method is a method of dispersing inorganic particles in a solvent using stirring, an ultrasonic wave, a sand mill, an attritor or a ball mill, adding an electron accepting compound thereto, stirring the mixture or dispersing the compound in the mixture, removing a solvent, and attaching the electron accepting compound to a surface of the inorganic particles. In the solvent removing method, for example, the solvent is removed by filtration or distillation. After the solvent is removed, the resultant may further be baked at a temperature of 100° C. or higher. The baking is not particularly limited as long as the baking is performed under a condition of a temperature and a time period which are the same as those of the condition for which the electrophotographic characteristics may be obtained. In the wet method, the moisture contained in the inorganic particles may be removed before the electron accepting compound is added, and examples thereof include a method of removing the moisture while performing stirring and heating in the solvent and a method of removing the moisture while performing azeotrope with the solvent.

The attachment of the electron accepting compound may be performed before or after performing the surface treatment for the inorganic particles with the surface treatment agent, or the attachment of the electron accepting compound and the surface treatment with the surface treatment agent may be performed at the same time.

The content of the electron accepting compound is, for example, suitably from 0.01% by weight to 20% by weight, and preferably from 0.01% by weight to 10% by weight with respect to the inorganic particles.

The binder resin used for the undercoat layer includes, for example, known polymer compounds, for example, an acetal resin (for example, polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin or an epoxy resin, and known materials, for example, a zirconium chelate compound, a titanium chelate compound, an aluminum chelate compound, a titanium alkoxide compound, an organic titanium compound or a silane coupling agent.

The binder resin used for the undercoat layer also includes, for example, a charge transporting resin having a charge transporting group and a conductive resin (for example, polyaniline).

Among these, as the binder resin used for the undercoat layer, a resin which is insoluble in a coating solvent of the upper layer is preferable, and a thermosetting resin, for example, a urea resin, a phenol resin, a phenol-formaldehyde resin, a melamine resin, a urethane resin, an unsaturated polyester resin, an alkyd resin or an epoxy resin; and a resin obtained by a reaction between a curing agent and at least one resin selected from the group consisting of a polyamide resin, a polyester resin, a polyether resin, a methacrylic resin, an acrylic resin, a polyvinyl alcohol resin and a polyvinyl acetal resin are particularly preferable.

In the case where these binder resins are used in a combination of two or more kinds thereof, the mixing ratio thereof is set as needed.

The undercoat layer may contain various additives for improvement in electrical characteristics, environmental stability and image quality.

The additive includes known materials, for example, a polycyclic condensed or azo electron transport pigment, a zirconium chelate compound, a titanium chelate compound, an aluminum chelate compound, a titanium alkoxide compound, an organic titanium compound or a silane coupling agent. The silane coupling agent is used in the surface treatment of the inorganic particles as described above, but may also be added to the undercoat layer as an additive.

The silane coupling agent as the additive includes, for example, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane and 3-chloropropyltrimethoxysilane.

The zirconium chelate compound includes, for example, zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide and isostearate zirconium butoxide.

The titanium chelate compound includes, for example, tetraisopropyl titanate, tetra-n-butyl titanate, butyl titanate dimer, tetra(2-ethylhexyl)titanate, titanium acetylacetonate, polytitanium acetylacetonate, titanium octylene glycolate, titanium lactate ammonium salt, titanium lactate, titanium lactate ethyl ester, titanium triethanolaminate and polyhydroxy titanium stearate.

The aluminum chelate compound includes, for example, aluminum isopropylate, monobutoxy aluminum diisopropylate, aluminum butyrate, diethyl acetoacetate aluminum diisopropylate and aluminum tris(ethylacetoacetate).

These additives may be used alone, in combination of plural compounds, or as a polycondensate.

The Vickers hardness of the undercoat layer is suitably 35 or more.

Surface roughness (ten-point average roughness) of the undercoat layer is suitably adjusted to be from 1/(4n) (n is a refractive index of the upper layer) to (½) of the laser wavelength A for exposure used, in order to prevent a moire image.

Resin particles or the like may be added to the undercoat layer for adjustment of surface roughness. The resin particles include, for example, silicone resin particles and cross-linked polymethyl methacrylate resin particles. Further, the surface of the undercoat layer may be polished for adjustment of the surface roughness. The polishing method includes, for example, buff polishing, sand blast treatment, wet honing and grinding treatment.

Formation of the undercoat layer is not particularly limited and a well-known formation method is used. For example, the undercoat layer is formed by forming a coated film with a coating solution for forming an undercoat layer which is obtained by adding the components described above to the solvent, drying the coated film, and, if desired, heating the dried film.

The solvent for preparing the coating solution for forming an undercoat layer includes known organic solvents, for example, an alcohol solvent, an aromatic hydrocarbon solvent, a halogenated hydrocarbon solvent, a ketone solvent, a ketone alcohol solvent, an ether solvent and an ester solvent.

The solvent specifically includes ordinary organic solvents, for example, methanol, ethanol, n-propanol, isopropanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene and toluene.

A method of dispersing inorganic particles at the time of preparing a coating solution for forming an undercoat layer includes known methods, for example, a roll mill, a ball mill, a vibration ball mill, an attritor, a sand mill, a colloid mill and a paint shaker.

A method of coating the coating solution for forming an undercoat layer on the conductive substrate includes ordinary methods, for example, a blade coating method, a wire bar coating method, a spray coating method, a dip coating method, a bead coating method, an air knife coating method or a curtain coating method.

The film thickness of the undercoat layer is set, for example, to preferably 15 μm or more and more preferably in the range from 20 μm to 50 μm.

(Intermediate Layer)

The illustration is omitted, but an intermediate layer may be further provided between the undercoat layer and the photosensitive layer.

The intermediate layer is, for example, a layer containing a resin. The resin used for the intermediate layer includes a polymer compound, for example, an acetal resin (for example, polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin and a melamine resin.

The intermediate layer may be a layer containing an organic metal compound. The organic metal compound used for the intermediate layer includes, for example, an organic metal compound containing a metal atom, for example, zirconium, titanium, aluminum, manganese or silicon.

The compounds used for the intermediate layer may be used alone, in combination of plural compounds, or as a polycondensate.

Among these, the intermediate layer is preferably a layer containing an organic metal compound containing a zirconium atom or a silicon atom.

Formation of the intermediate layer is not particularly limited and a well-known formation method is used. For example, the intermediate layer is formed by forming a coated film with a coating solution for forming an intermediate layer which is obtained by adding the components described above to a solvent, drying the coated film, and, if desired, heating the dried film.

A coating method of forming the intermediate layer includes ordinary methods, for example, a dip coating method, an extrusion coating method, a wire bar coating method, a spray coating method, a blade coating method, a knife coating method or a curtain coating method.

The film thickness of the intermediate layer is, for example, preferably set in the range from 0.1 μm to 3 μm. Further, the intermediate layer may be used as the undercoat layer.

(Charge Generation Layer)

The charge generation layer is, for example, a layer containing a charge generation material and a binder resin. The charge generation layer may be a vapor-deposited layer of the charge generation material. The vapor-deposited layer of the charge generation material is preferable in the case of using incoherent light source, for example, a light emitting diode (LED) or an organic electro-luminescence (EL) image array.

The charge generation material includes, for example, an azo pigment, for example, bisazo or trisazo; a condensed ring aromatic pigment, for example, dibromoanthanthrone; a perylene pigment; a pyrrolopyrrole pigment; a phthalocyanine pigment; zinc oxide; and trigonal selenium.

Among these, a metal phthalocyanine pigment or a metal-free phthalocyanine pigment is preferably used as the charge generation material, in order to respond to laser exposure of a near-infrared region. Specifically, for example, hydroxygallium phthalocyanine disclosed, for example, in JP-A-5-263007 and JP-A-5-279591; chlorogallium phthalocyanine disclosed, for example, in JP-A-5-98181; dichlorotin phthalocyanine disclosed, for example, in JP-A-5-140472 and JP-A-5-140473; and titanyl phthalocyanine disclosed, for example, in JP-A-4-189873 are more preferred.

On the other hand, a condensed ring aromatic pigment, for example, dibromoanthanthrone; a thioindigo pigment; a porphyrazine compound; zinc oxide; trigonal selenium; and a bisazo pigment disclosed in JP-A-2004-78147 and JP-A-2005-181992 are preferred as the charge generation material, in order to respond to laser exposure of a near-ultraviolet region.

The charge generation materials described above may be used even in the case of using the incoherent light source, for example, an LED or an organic EL image array having a light-emitting center wavelength from 450 nm to 780 nm. However, in the case where the photosensitive layer is used as a thin film having a thickness of 20 μm or less from the standpoint of resolution, the field intensity in the photosensitive layer increases, and decrease in charging due to charge injection from the substrate and image defects which are so-called black spots easily occur. This phenomenon significantly occurs when a charge generation material which is a p-type semiconductor, for example, trigonal selenium or phthalocyanine pigment and easily generates dark current is used.

In contrast, in the case of using an n-type semiconductor, for example, a condensed ring aromatic pigment, a perylene pigment or an azo pigment is used as the charge generation material, the dark current is hardly generated, and the image defects called black spots may be prevented even in the case of using a thin film. As the n-type charge generation material, for example, Compounds (CG-1) to (CG-27) disclosed in paragraphs [0288] to [0291] of JP-A-2012-155282 are used, but the n-type charge generation material is not limited thereto.

The determination of the n-type is performed by polarity of flowing photocurrent, using an ordinarily used time-of-flight method, and a material which easily causes electrons to flow as a carrier than holes is determined as the n-type.

The binder resin used in the charge generation layer is selected from a wide range of insulation resins, and the binder resin may be selected from organic photoconductive polymers, for example, poly-N-vinylcarbazole, polyvinyl anthracene, polyvinyl pyrene and polysilane.

The binder resin includes, for example, a polyvinyl butyral resin, a polyarylate resin (for example, polycondensate of a bisphenol and an aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinyl pyridine resin, a cellulose resin, a urethane resin, an epoxy resin, casein, a polyvinyl alcohol resin and a polyvinyl pyrrolidone resin. Herein, an "insulation property" indicates that volume resistivity is $10^{13}$ Ωcm or more.

These binder resins are used alone or in combination of two or more thereof.

A blending ratio of the charge generation material and the binder resin is preferably in the range from 10:1 to 1:10 in terms of a weight ratio.

The charge generation layer may contain other well-known additives.

Formation of the charge generation layer is not particularly limited, and a well-known formation method is used. For example, the charge generation layer is formed by forming a coated film of a coating solution for forming a charge generation layer obtained by adding the components described above to a solvent, drying the coated film, and, if desired, heating the coated film. The formation of the charge generation layer may be performed by vapor deposition of the charge generation material. The formation of the charge generation layer by the vapor deposition is particularly preferable in the case of using a condensed ring aromatic pigment or a perylene pigment as the charge generation material.

The solvent used for preparing the coating solution for forming a charge generation layer includes, for example, methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene and toluene. These solvents are used alone or in combination of two or more thereof.

As a method of dispersing particles (for example, charge generation material) in the coating solution for forming a charge generation layer, a media dispersion instrument, for example, a ball mill, a vibration ball mill, an attritor, a sand mill or a horizontal sand mill, or a media-less dispersion instrument, for example, a stirrer, an ultrasonic wave dispersion instrument, a roll mill or a high-pressure homogenizer is used. The high-pressure homogenizer includes, for example, a collision type of dispersing a dispersion liquid by causing liquid-liquid collision or liquid-wall collision in a high pressure state, and a flow-through method of dispersing a dispersion liquid by causing the dispersion to flow through a minute flow path in a high pressure state.

When performing the dispersion, an average particle diameter of the charge generation materials in the coating solution for forming a charge generation layer is effectively 0.5 μm or less, preferably 0.3 μm or less, and more preferably 0.15 μm or less.

A method of coating the coating solution for forming a charge generation layer on the undercoat layer (or on the intermediate layer) includes ordinary methods, for example, a blade coating method, a wire bar coating method, a spray coating method, a dip coating method, a bead coating method, an air knife coating method or a curtain coating method.

A film thickness of the charge generation layer is set, for example, preferably in the range from 0.1 μm to 5.0 μm, and more preferably in the range from 0.2 μm to 2.0 μm.

(Charge Transport Layer)

The charge transport layer is a layer containing a charge transport material and a binder resin. The charge transport layer may be a layer containing a polymer charge transport material.

The charge transport material includes an electron transport compound, for example, a quinone compound, for example, p-benzoquinone, chloranil, bromanil or anthraquinone; a tetracyanoquinodimethane compound; a fluorenone compound, for example, 2,4,7-trinitrofluorenone; a xanthone compound; a benzophenone compound; a cyanovinyl compound; and an ethylenic compound. The charge transport material also includes a hole transport compound, for example, a triarylamine compound, a benzidine compound, an arylalkane compound, an aryl-substituted ethylene compound, a stilbene compound, an anthracene compound, or a hydrazone compound. These charge transport materials may be used alone or in combination of two or more thereof, and the charge transport material is not limited thereto.

From the standpoint of charge mobility, the charge transport material is preferably a triarylamine derivative represented by structural formula (a-1) shown below or a benzidine derivative represented by structural formula (a-2) shown below.

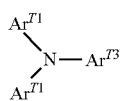

(a-1)

In structural formula (a-1), each of $Ar^{T1}$, $Ar^{T2}$ and $Ar^{T3}$ independently represents a substituted or unsubstituted aryl group, $-C_6H_4-C(R^{T4})=C(R^{T5})(R^{T6})$ or $-C_6H_4-CH=CH-CH=C(R^{T7})(R^{T8})$. Each of $R^{T4}$, $R^{T5}$, $R^{T6}$, $R^{T7}$ and $R^{T8}$ independently represents a hydrogen atom, a substituted or unsubstituted alkyl group or a substituted or unsubstituted aryl group.

The substituent of the respective groups described above includes, for example, a halogen atom, an alkyl group having from 1 to 5 carbon atoms and an alkoxy group having from 1 to 5 carbon atoms. The substituent of the respective groups described above also includes, a substituted amino group substituted with an alkyl group having from 1 to 3 carbon atoms.

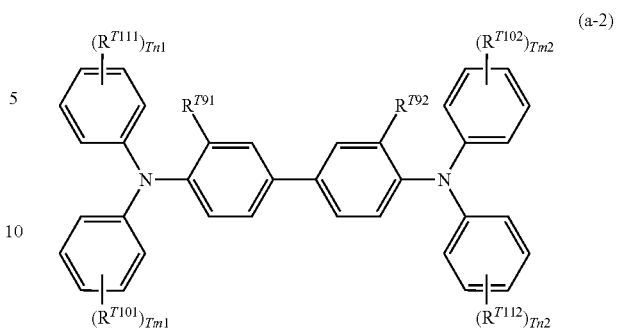

(a-2)

In structural formula (a-2), each of $R^{T91}$ and $R^{T92}$ independently represents a hydrogen atom, a halogen atom, an alkyl group having from 1 to 5 carbon atoms or an alkoxy group having from 1 to 5 carbon atoms. Each of $R^{T101}$, $R^{T102}$, $R^{T111}$ and $R^{T112}$ independently represents a halogen atom, an alkyl group having from 1 to 5 carbon atoms, an alkoxy group having from 1 to 5 carbon atoms, an amino group substituted with an alkyl group having from 1 to 2 carbon atoms, a substituted or unsubstituted aryl group, $-C(R^{T12})=C(R^{T13})(R^{T14})$ or $-CH=CH-CH=C(R^{T15})(R^{T16})$. Each of $R^{T12}$, $R^{T13}$, $R^{T14}$, $R^{T15}$ and $R^{T16}$ independently represents a hydrogen atom, a substituted or unsubstituted alkyl group or a substituted or unsubstituted aryl group. Each of $Tm_1$, $Tm_2$, $Tn_1$ and $Tn_2$ independently represents an integer from 0 to 2.

The substituent of the respective groups described above includes, for example, a halogen atom, an alkyl group having from 1 to 5 carbon atoms and an alkoxy group having from 1 to 5 carbon atoms. The substituent of the respective groups described above also includes, a substituted amino group substituted with an alkyl group having from 1 to 3 carbon atoms.

Among the triarylamine derivative represented by structural formula (a-1) and benzidine derivative represented by structural formula (a-2), a triarylamine derivative having "$-C_6H_4-CH=CH-CH=C(R^{T7})(R^{T8})$" and a benzidine derivative having "$-CH=CH-CH=C(R^{T15})(R^{T16})$" are preferred from the standpoint of charge mobility.

As the polymer charge transport material, known materials having a charge transporting property, for example, poly-N-vinyl carbazole or polysilane are used. In particular, polyester type polymer charge transport materials disclosed, for example, in JP-A-8-176293 and JP-A-8-208820 are particularly preferred. The polymer charge transport material may be used alone or in combination with a binder resin.

The binder resin used in the charge transport layer includes, for example, a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone-alkyd resin, a phenol-formaldehyde resin, a styrene-alkyd resin, a poly-N-vinylcarbazole and a polysilane. Among these, a polycarbonate resin or a polyarylate resin is preferable as the binder resin. These binder resins may be used alone or in combination of two or more thereof.

A blending ratio of the charge transport material and the binder resin is preferably in the range from 10:1 to 1:5 in terms of a weight ratio.

The charge transport layer may contain other well-known additives.

Formation of the charge transport layer is not particularly limited, and a well-known forming method is used. For example, the charge transport layer is formed by forming a coated film of a coating solution for forming a charge transport layer obtained by adding the components described above to a solvent, drying the coated film, and, if desired, heating the coated film.

The solvent for preparing the coating solution for forming a charge transport layer includes ordinary organic solvents, for example, an aromatic hydrocarbon, for example, benzene, toluene, xylene or chlorobenzene; a ketone, for example, acetone or 2-butanone; a halogenated aliphatic hydrocarbon, for example, methylene chloride, chloroform or ethylene chloride; or a cyclic or straight-chain ether, for example, tetrahydrofuran or ethyl ether. These solvents are used alone or in combination of two or more thereof.

A method of coating the coating solution for forming a charge transport layer on the charge generation layer includes ordinary methods, for example, a blade coating method, a wire bar coating method, a spray coating method, a dip coating method, a bead coating method, an air knife coating method or a curtain coating method.

A film thickness of the charge transport layer is set, for example, preferably in the range from 5 μm to 50 μm, and more preferably in the range from 10 μm to 30 μm.

(Protective Layer)

The protective layer is provided on the photosensitive layer, if desired. For example, the protective layer is provided for the purpose of preventing the photosensitive layer during charge from being chemically changed or further improving the mechanical strength of the photosensitive layer.

For this reason, the protective layer suitably employs a layer composed of a cured film (a crosslinked film), that is a protective layer having a crosslinked structure. These layers include, for example, layers described 1) or 2) shown below.

1) A layer which is composed of a cured film of a composition containing a reactive group-containing charge transport material having a reactive group and a charge transport skeleton in the same molecule (that is, a layer containing a polymer or a crosslinked product of the reactive group-containing charge transport material)

2) A layer which is composed of a cured film of a composition containing a non-reactive charge transport material and a reactive group-containing non-charge transport material having a reactive group without a charge transport skeleton (that is, a layer containing a non-reactive charge transport material and a polymer or crosslinked product of the reactive group-containing non-charge transport material)

The reactive group of the reactive group-containing charge transport material includes well-known reactive groups, for example, a chain polymerizable group, an epoxy group, —OH, —OR [wherein, R represents an alkyl group], —NH$_2$, —SH, —COOH, —SiR$^{Q1}_{3-Qn}$(OR$^{Q2}$)$_{Qn}$ [wherein, R$^{Q1}$ represents a hydrogen atom, an alkyl group or a substituted or unsubstituted aryl group. R$^{Q2}$ represents a hydrogen atom, an alkyl group or a trialkylsilyl group. Qn represents integer from 1 to 3].

The chain polymerizable group is not particularly limited as long as it is a functional group capable of radical polymerization, and includes, for example, a functional group having a group containing at least carbon double bond. Specifically, the chain polymerizable group includes, for example, a group containing at least one selected from a vinyl group, a vinyl ether group, a vinyl thioether group, a styryl group (vinyl phenyl group), an acryloyl group, a methacryloyl group, and derives thereof. Among them, in view of excellent reactivity, the chain polymerization group is preferably a group containing at least one selected from a vinyl group, a styryl group (vinyl phenyl group), an acryloyl group, a methacryloyl group, and the derives thereof.

The charge transport skeleton of the reactive group-containing charge transport material is not particularly limited as long as it is a known structure in the electrophotographic photoreceptor. The charge transport skeleton includes a skeleton derived from a nitrogen-containing hole transport compound, for example, a triarylamine compound, a benzidine compound or a hydrazine compound, and having a structure conjugated with a nitrogen atom. Among these, a triarylamine skeleton is preferred.

The reactive group-containing charge transport material having the reactive group and the charge transport skeleton, the non-reactive charge transport material, and the reactive group-containing non-charge transport material may be selected from well-known materials.

The protective layer may contain other well-known additives.

Formation of the protective layer is not particularly limited, and a well-known formation method is used. For example, the protective layer is formed by forming a coated film of a coating solution for forming a protective layer obtained by adding the components described above to a solvent, drying the coated film, and, if desired, heating the coated film.

The solvent for preparing the coating solution for forming a protective layer includes, for example, an aromatic solvent, for example, toluene or xylene; a ketone solvent, for example, methyl ethyl ketone, methyl isobutyl ketone or cyclohexanone; an ester solvent, for example, ethyl acetate or butyl acetate; an ether solvent, for example, tetrahydrofuran or dioxane; a cellosolve solvent, for example, ethylene glycol monomethyl ether; and an alcohol solvent, for example, isopropyl alcohol or butanol. These solvents may be used alone or in combination of two or more thereof. The coating solution for forming a protective layer may be a solventless coating solution.

A method of coating the coating solution for forming a protective layer on the photosensitive layer (for example, the charge transport layer) includes ordinary methods, for example, a dip coating method, an extrusion coating method, a wire-bar coating method, a spray coating method, a blade coating method, a knife coating method or a curtain coating method.

A film thickness of the protective layer is set, for example, preferably in the range from 1 μm to 20 μm, and more preferably in the range from 2 μm to 10 μm.

(Single Layer Type Photosensitive Layer)

The single layer-type photosensitive layer (a charge generation/charge transport layer) is a layer containing, for example, a charge generation material and a charge transport material, and a binder resin and other well-known additives, if desired. These materials are the same as those described as to the charge generation layer and the charge transport layer.

In the single layer-type photosensitive layer, the content of the charge generation material is suitably from 0.1% by weight to 10% by weight, and preferably from 0.8% by weight to 5% by weight with respect to the total solid content. In addition, in the single layer-type photosensitive layer, the content of the charge transport material is suitably from 5% by weight to 50% by weight with respect to the total solid content.

The method of forming the single layer-type photosensitive layer is the same as the method of forming the charge generation layer or the charge transport layer.

A film thickness of the single layer-type photosensitive layer is, for example, suitably from 5 µm to 50 µm, and preferably from 10 µm to 40 µm.

[Image Forming Apparatus (and Process Cartridge)]

The image forming apparatus according to the exemplary embodiment includes an electrophotographic photoreceptor, a charging unit which charges a surface of the electrophotographic photoreceptor, an electrostatic latent image forming unit which forms an electrostatic latent image on the charged surface of the electrophotographic photoreceptor, a developing unit which forms a toner image by developing the electrostatic latent image formed on the surface of the electrophotographic photoreceptor by using a developer containing a toner, and a transfer unit which transfers the toner image to a surface of a recording medium. In addition, as the electrophotographic photoreceptor, the electrophotographic photoreceptor according to the exemplary embodiment is employed.

The image forming apparatus according to the exemplary embodiment is applicable to well-known image forming apparatuses, for example, an apparatus including a fixing unit which fixes a toner image transferred on a surface of a recording medium; a direct-transfer type apparatus which directly transfers the toner image formed on the surface of the electrophotographic photoreceptor to a recording medium; an intermediate transfer type apparatus which primarily transfers the toner image formed on the surface of the electrophotographic photoreceptor to a surface of an intermediate transfer member, and secondarily transfers the toner image transferred to the surface of the intermediate transfer member to a surface of a recording medium; an apparatus including a cleaning unit which cleans the surface of the electrophotographic photoreceptor before being charged and after transferring the toner image; an apparatus including an erasing unit which erases charges by irradiating the surface of the electrophotographic photoreceptor with erasing light before being charged and after transferring the toner image; and an apparatus including an electrophotographic photoreceptor heating member which increases a temperature of the electrophotographic photoreceptor so as to decrease a relative temperature.

In the case where the intermediate transfer type apparatus is used, the transfer unit is configured to include an intermediate transfer member to a surface of which the toner image is transferred, a primary transfer unit which primarily transfers the toner image formed on the surface of the electrophotographic photoreceptor to the surface of the intermediate transfer member, and a secondary transfer unit which secondarily transfers the toner image formed on the surface of the intermediate transfer member to the surface of the recording medium.

The image forming apparatus according to the exemplary embodiment may be any of a dry development type image forming apparatus and a wet development type (development type using a liquid developer) image forming apparatus.

In the image forming apparatus according to the exemplary embodiment, for example, a unit including the electrophotographic photoreceptor may be a cartridge structure (process cartridge) detachably attached to the image forming apparatus. As the process cartridge, for example, a process cartridge including the electrophotographic photoreceptor according to the exemplary embodiment is preferably used. In addition to the electrophotographic photoreceptor, at least one selected from the group consisting of a charging unit, an electrostatic latent image forming unit, a developing unit and a transfer unit may be included in the process cartridge.

Hereinafter, an example of the image forming apparatus of the exemplary embodiment will be described, but, the invention is not limited thereto. The main components illustrated in the drawing are described, and the descriptions of other components are omitted.

Figure 2:
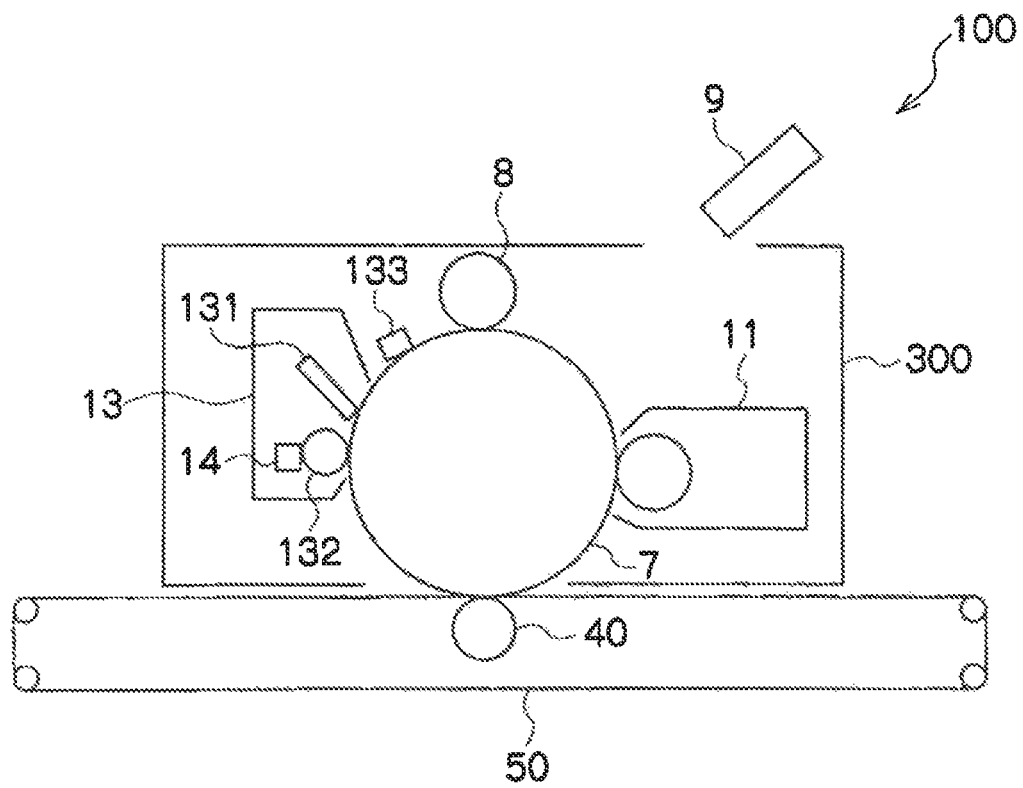
FIG. 2 is a schematic construction view illustrating one example of an image forming apparatus according to the exemplary embodiment.

FIG. 2 is a schematic construction view illustrating one example of the image forming apparatus according to the exemplary embodiment.

As shown in FIG. 2, an image forming apparatus 100 according to the exemplary embodiment includes a process cartridge 300 which includes an electrophotographic photoreceptor 7, an exposing device 9 (an example of an electrostatic latent image forming unit), a transfer device 40 (primary transfer device), and an intermediate transfer member 50. In the image forming apparatus 100, the exposing device 9 is located at a position such that the exposing device 9 applies light to the electrophotographic photoreceptor 7 through an opening in the process cartridge 300. The transfer device 40 is located at a position such that the transfer device 40 opposes the electrophotographic photoreceptor 7 with the intermediate transfer member 50 therebetween. The intermediate transfer member 50 is arranged so that a part of the intermediate transfer member 50 contacts the electrophotographic photoreceptor 7. Although not illustrated in the drawing, a secondary transfer device which transfers the toner image on the intermediate transfer member 50 onto a recording medium (for example, paper sheet) is also provided. The intermediate transfer member 50, the transfer device 40 (primary transfer device) and the secondary transfer device (not illustrated in the drawing) correspond to an example of the transfer unit.

The process cartridge 300 illustrated in FIG. 2 integrally supports the electrophotographic photoreceptor 7, a charging device 8 (an example of a charging unit), a developing device 11 (an example of a developing unit) and a cleaning device 13 (an example of a cleaning unit) in the housing. The cleaning device 13 includes a cleaning blade 131 (an example of a cleaning member), and the cleaning blade 131 is arranged to make contact with a surface of the electrophotographic photoreceptor 7. The cleaning member may be a conductive or insulating fibrous member instead of the cleaning blade 131. The conductive or insulating fibrous member may be used alone or in combination with the cleaning blade 131.

FIG. 2 illustrates an example of the image forming apparatus which includes a fibrous member 132 (roll shape) which supplies a lubricant 14 onto the surface of the electrophotographic photoreceptor 7, and a fibrous member 133 (flat brush shape) which assists cleaning. These members are arranged, if desired.

Individual components of the image forming apparatus according to the exemplary embodiment will be described below.

—Charging Device—

As the charging device 8, a contact-type charger using, for example, a conductive or semi-conductive charging roller, a charging brush, a charging film, a charging rubber blade or a charging tube is used. Further, a charger which is known per se, for example, a non-contact-type roller charger or a scorotron charger or a corotron charger using corona discharge is also used.

—Exposing Device—

The exposing device 9 includes, for example, an optical device which exposes intended-imagewise the surface of the electrophotographic photoreceptor 7 with light from a semiconductor laser, an LED or a liquid crystal shutter. The wavelength of the light source is to be within the region of the spectral sensitivity of the electrophotographic photoreceptor. The mainstream semiconductor laser is a near infrared laser having an oscillation wavelength around 780 nm. However, the wavelength of the laser is not limited to this, and a laser having an oscillation wavelength on the order of 600 nm or a blue laser having an oscillation wavelength from 400 nm to 450 nm may also be used. Further, a surface-emission type laser light source capable of outputting a multibeam is effective for forming color images.

—Developing Device—

The developing device 11 includes, for example, an ordinary developing device which conducts development by using a developer in a contact or non-contact manner. The developing device 11 is not particularly limited as long as it has the function described above, and is selected according to the purpose. The developing device includes, for example, a known developing device which has a function of causing a one-component developer or a two-component developer to attach to the electrophotographic photoreceptor 7 by using a brush, a roller or the like. Among them, the developing device using a development roller retaining the developer on the surface thereof is preferred.

The developer used in the developing device 11 may be a one-component developer containing a toner alone or may be a two-component developer containing a toner and a carrier. The developer may be magnetic or non-magnetic. Well-known developers may be used as the developer.

—Cleaning Device—

A cleaning blade type device including the cleaning blade 131 is used as the cleaning device 13.

A fur brush cleaning type or a type of performing development and cleaning simultaneously may be employed other than the cleaning blade type.

—Transfer Device—

The transfer device 40 includes a contact-type transfer charger using a belt, a roller, a film, a rubber blade or the like, and a transfer charger which is known per se, for example, a scorotron transfer charger or a corotron transfer charger using corona discharge.

—Intermediate Transfer Member—

As the intermediate transfer member 50, a belt-shaped member (intermediate transfer belt) containing a polyimide, a polyamideimide, a polycarbonate, a polyarylate, a polyester, rubber or the like which is imparted with a semiconductive property. As the intermediate transfer member, a drum-shaped member may be used other than the belt-shaped member.

Figure 3:
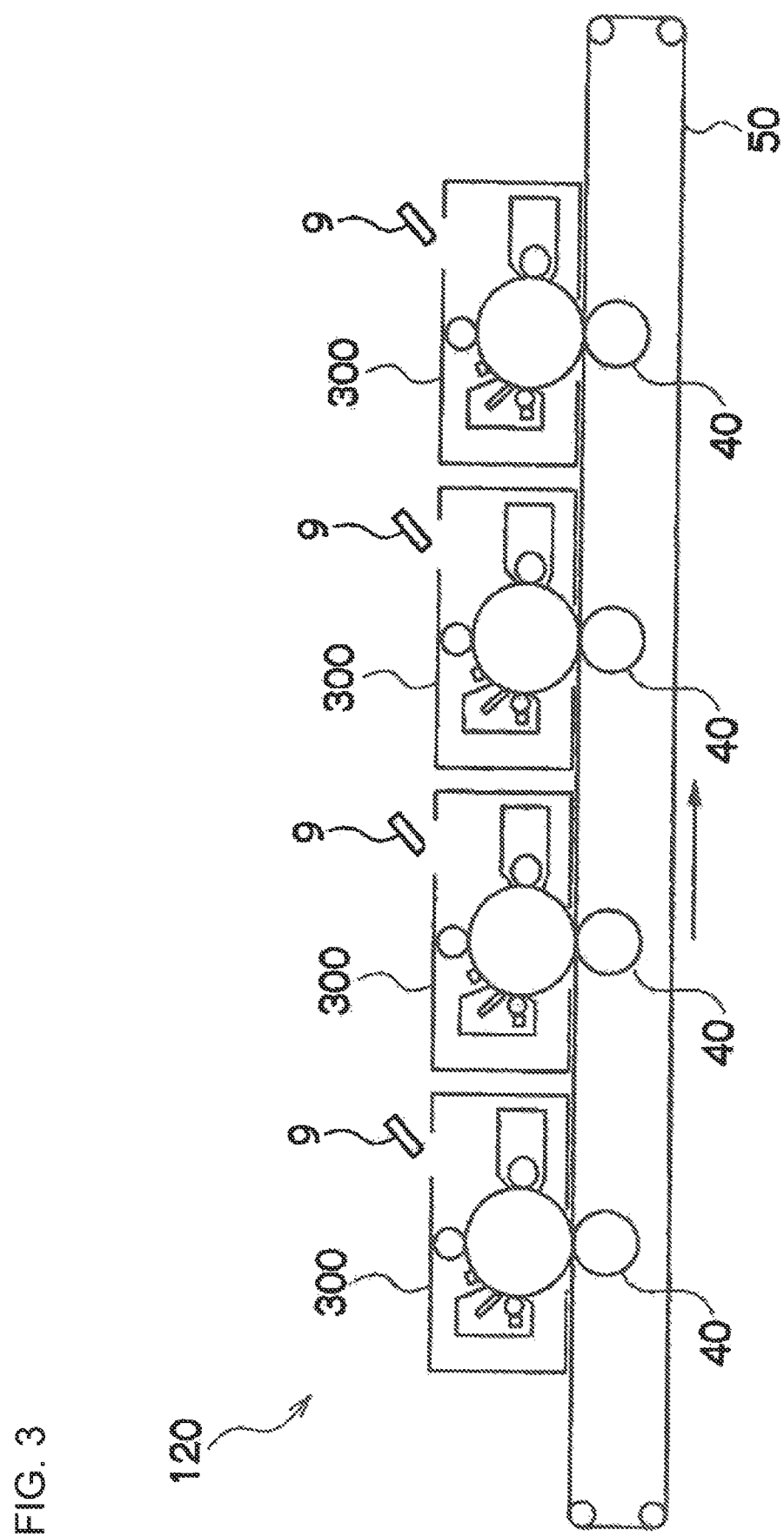
FIG. 3 is a schematic construction view illustrating another example of an image forming apparatus according to the exemplary embodiment.

FIG. 3 is a schematic construction view illustrating another example of the image forming apparatus of the exemplary embodiment.

An image forming apparatus 120 illustrated in FIG. 3 is a multi-color image forming apparatus of a tandem-type equipped with four process cartridges 300. In the image forming apparatus 120, four process cartridges 300 are arranged side-by-side on the intermediate transfer member 50. One electrophotographic receptor is used for one color. The image forming apparatus 120 has the same structure as the image forming apparatus 100 except for that the image forming apparatus 120 is of a tandem type.

(Other Applications of Dispersant Attached PTFE Particle)

The dispersant attached PTFE particle according to the exemplary embodiment is used as an external additive for toner or an external additive for a powder coating.

For example, in the case of applying the dispersant attached PTFE particle to the external additive for toner, for example, an electrostatic charge image developing toner containing a toner particle and the dispersant attached PTFE particle as the external additive is used as the toner. The toner particle contains a resin (binder resin). The toner particle may contain other additives, for example, a coloring agent or a release agent, if desired.

In the case of applying the dispersant attached PTFE particle to the external additive for a powder coating, for example, a powder coating contains a powder particle and the dispersant attached PTFE particle as the external additive is used as the powder coating. The powder particle contains a thermosetting resin and a heat curing agent. The powder particle may contain other additives, for example, a coloring agent, if desired.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

EXAMPLES

Hereinafter, the invention will be described with reference to the examples, but the invention should not be construed as being limited thereto. All "part" and "%" therein are weigh basis unless otherwise specified.

Example 1

—Production of PTFE Particles A—

Commercially available PTFE particles having an average particle diameter of 3.5 μm (primary particle diameter of 0.2 μm) are washed and then treated with a fluorine-containing dispersant in the following manner to produce PTFE particles, which are designated as PTFE particles A.

400 parts by weight of tetrahydrofuran and 15 parts by weight of PTFE particles are charged into a high-pressure homogenizer (trade name: LA-33S manufactured by Nanomizer Inc.), a pressure of the high-pressure homogenizer is set at 500 kg/cm$^2$ and the mixture described above is passed through the high-pressure homogenizer 4 times to conduct a washing treatment. The dispersion liquid is treated with a centrifuge and then the transparent liquid of the upper layer is removed. Subsequently, tetrahydrofuran is added thereto so that the amount of tetrahydrofuran is 415 parts by weight, and the mixture is again subjected to the dispersion treatment with the high-pressure homogenizer, the dispersion liquid is treated with a centrifuge, and the transparent liquid of the upper layer is removed. After repeating these procedures further 3 times, 1.5 parts by weight of GF400 (manufactured by Toagosei Co., Ltd., a surfactant composed of at least a methacrylate having a fluorinated alkyl group as a polymerization component) is added thereto as the fluorine-containing dispersant, then tetrahydrofuran is added thereto so that the amount of tetrahydrofuran is 415 parts by weight, and the mixture is again subjected to the dispersion treatment with the high-pressure homogenizer, and then the solvent is distilled off under a reduced pressure. After drying, the resulting particles are pulverized in a mortar. The resulting particles are designated as PTFE particles A.

—Measurement of PFOA Content in PTFE Particles A—

The PFOA content in PTFE particles A is measured according to the method described hereinbefore and as a result, it is found to be 5 ppb.

—Production of PTFE Composition L-A—

45 parts of a benzidine compound represented by formula (CT-1) shown below and 55 parts of a polymer compound (viscosity average molecular weight of 40,000) having a repeating unit represented by formula (B-1) shown below are dissolved in 350 parts by weight of toluene and 150 parts of tetrahydrofuran, 10 parts of PTFE particles A is added thereto, and treated 5 times with a high-pressure homogenizer to produce PTFE composition L-A.

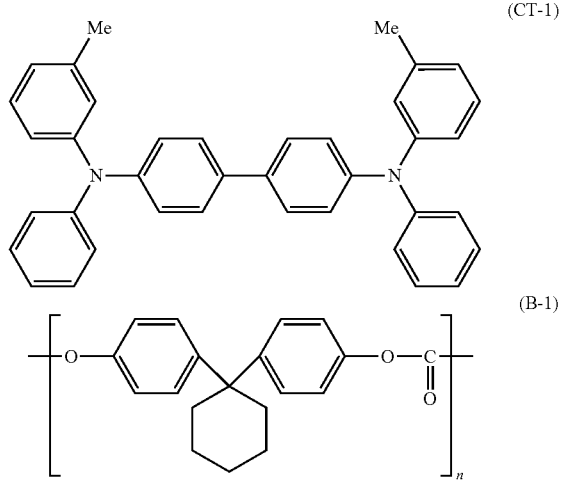

—Evaluation of PTFE Composition L-A—

The dispersion state of PTFE in PTFE composition L-A obtained is evaluated using a laser diffraction particle size distribution measuring device (Mastersizer 3000 manufactured by Malvern Instruments Ltd.) and as a result, it is found that the average particle size is 0.22 μm.

—Production and Evaluation of PTFE Layered Material F-A]—

PTFE composition L-A is coated on a glass substrate using a gap coater and heated at 130° C. for 45 minutes to prepare PTFE layered material F-A having a film thickness of 5 μm. The average particle diameter of the PTFE particles in the layered material obtained is 0.23 μm.

—Production of Electrophotographic Photoreceptor A—

Photoreceptor A is produced in the manner described below.

Formation of Undercoat Layer 100 parts of zinc oxide (manufactured by TAYCA Corp., average particle diameter of 70 nm and specific surface area of 15 m²/g) is stirred and mixed with 500 parts of tetrahydrofuran, 1.3 parts of a silane coupling agent (KBM503 manufactured by Shin-Etsu Chemical Co., Ltd.) is added thereto, and stirred for 2 hours. Then, tetrahydrofuran is distilled off under a reduced pressure, and baking is performed at 120° C. for 3 hours to obtain a silane coupling agent surface treated-zinc oxide.

110 parts of the zinc oxide subjected to the surface treatment and 500 parts of tetrahydrofuran are stirred and mixed, a solution obtained by dissolving 0.6 parts of alizarin in 50 parts of tetrahydrofuran is added thereto, and stirred at 50° C. for 5 hours. Then, zinc oxide having alizarin applied thereto is separated by filtration under a reduced pressure, and dried at 60° C. under a reduced pressure to obtain alizarin-applied zinc oxide.

60 parts of the alizarin-added zinc oxide, 13.5 parts of a curing agent (blocked isocyanate, Sumidur 3175 manufactured by Sumitomo Bayer Urethane Co., Ltd.), 15 parts of a butyral resin (S-LEC BM-1 manufactured by Sekisui Chemical Co., Ltd.) and 85 parts of methyl ethyl ketone are mixed to obtain a mixed solution. 38 parts of the mixed solution and 25 parts of methyl ethyl ketone are mixed and dispersed for 2 hours by a sand mill using glass beads having a diameter of 1 mmφ to obtain a dispersion liquid.

To the dispersion liquid obtained are added 0.005 parts of dioctyl tin dilaurate as a catalyst and 45 parts of silicone resin particles (Tospearl 145 manufactured by Momentive Performance Materials Japan Inc.) to obtain a coating solution for an undercoat layer. The coating solution for an undercoat layer is applied to an aluminum substrate having a diameter of 47 mm, a length of 357 mm and a wall thickness of 1 mm by a dip coating method, and dried and cured at 170° C. for 30 minutes to obtain an undercoat layer having a thickness of 25 μm.

Formation of Charge Generation Layer 1 part of hydroxy gallium phthalocyanine having strong diffraction peaks at Bragg angles (2θ±0.20) of 7.5°, 9.9°, 12.5°, 16.3°, 18.6°, 25.1° and 28.3° in X-ray diffraction spectrum is mixed with 1 part of polyvinyl butyral (S-LEC BM-S manufactured by Sekisui Chemical Co., Ltd.) and 80 parts of n-butyl acetate, and the mixture is subjected to dispersion treatment for 1 hour with glass beads by a paint shaker to prepare a coating solution for a charge generation layer. The coating solution for a charge generation layer is subjected to dip coating on the undercoat layer formed on the conductive substrate and dried by heating at 100° C. for 10 minutes to form a charge generation layer having a film thickness of 0.15 μm.

Formation of Charge Transport Layer

PTFE Composition L-A described above is coated on the charge generation layer described above by a dip coating method and heated at 130° C. for 45 minutes to form a charge transport layer having a film thickness of 13 μm.

Through the procedures described above, each photoreceptor is produced.

—Evaluation of Electrophotographic Photoreceptor A—

Using the photoreceptor obtained, the evaluations described below are performed.

Visual Evaluation

The surface of the photoreceptor (surface of the charge transport layer) obtained is visually observed. The evaluation criteria are as follows.

A: Streak is not observed.
B: Slight streak-like defects are observed.
C: Clear streak-like defects are observed.

Evaluation of Image Quality

The photoreceptor obtained is loaded in an image forming apparatus (ApeosPort C4300 manufactured by Fuji Xerox Co., Ltd.). Using the apparatus, a 5% half-tone image is output on 10,000 sheets of A4 paper. The image defects are evaluated by observing the images on the first sheet, the 100th sheet, the 5,000th sheet and the 10,000th sheet. The evaluation criteria are as follows.
A: Image defects are not observed.
B: slight image defects are observed by a magnifying glass. (level without any problem)
C: Image defects are visually observed.
D: Clear streak-like image defects are observed.

Example 2

—Production of PTFE Particles B—

Commercially available PTFE particles having an average particle diameter of 4.5 µm (primary particle diameter of 0.2 µm) are washed and then treated with a fluorine-containing dispersant in the same manner as in Example 1 to produce PTFE particles, which are designated as PTFE particles B.

—Measurement of PFOA Content in PTFE Particles B—

The PFOA content in PTFE particles B is measured according to the method described hereinbefore same as in PTFE particles A and as a result, it is found to be 0 ppb.

—Production of PTFE Composition L-B—

PTFE composition L-B is produced in the same procedures as in Example 1 except for changing PTFE particles A to PTFE particles B.

—Evaluation of PTFE Composition L-B—

The evaluation same as in Example 1 is performed except for changing PTFE composition L-A to PTFE composition L-B. The results obtained are shown in Table 1.

—Production and Evaluation of PTFE Layered Material F-B]—

The production and the evaluation of PTFE layered material F-B are performed in the same procedures as in Example 1 except for changing PTFE composition L-A to PTFE composition L-B. The results obtained are shown in Table 1.

—Production of Electrophotographic Photoreceptor B—

Electrophotographic photoreceptor B is produced in the same procedures as in Example 1 except for changing PTFE composition L-A to PTFE composition L-B.

—Evaluation of Electrophotographic Photoreceptor B—

As to the electrophotographic photoreceptor B obtained, the same evaluation as in Example 1 are performed. The results obtained are shown in Table 1.

Example 3

In the production of PTFE particles A of Example 1, the PTFE particles are washed so that the total amount of PFOA is 25 ppb and then treated with the fluorine-containing dispersant to produce PTFE particles, which are designated as PTFE particles C.

Subsequently, production and evaluation of PTFE composition L-C, production and evaluation of PTFE layered material F-C, and production and evaluation of electrophotographic photoreceptor C are performed in the same manner as in Example 1 except for using PTFE particles C in place of PTFE particles A. The results obtained are shown in Table 1.

Example 10

In the production of PTFE particles A of Example 1, the PTFE particles are washed so that the total amount of PFOA is 0.01 ppb and then treated with the fluorine-containing dispersant to produce PTFE particles, which are designated as PTFE particles D.

Subsequently, production and evaluation of PTFE composition L-D, production and evaluation of PTFE layered material F-D, and production and evaluation of electrophotographic photoreceptor D are performed in the same manner as in Example 1 except for using PTFE particles D in place of PTFE particles A. The results obtained are shown in Table 1.

Example 11

In the production of PTFE particles A of Example 1, the PTFE particles are washed so that the total amount of PFOA is 0.1 ppb and then treated with the fluorine-containing dispersant to produce PTFE particles, which are designated as PTFE particles F.

Subsequently, production and evaluation of PTFE composition L-F, production and evaluation of PTFE layered material F-F, and production and evaluation of electrophotographic photoreceptor F are performed in the same manner as in Example 1 except for using PTFE particles F in place of PTFE particles A. The results obtained are shown in Table 1.

Example 12

In the production of PTFE particles A of Example 1, the PTFE particles are washed so that the total amount of PFOA is 15 ppb and then treated with the fluorine-containing dispersant to produce PTFE particles, which are designated as PTFE particles G.

Subsequently, production and evaluation of PTFE composition L-G, production and evaluation of PTFE layered material F-G, and production and evaluation of electrophotographic photoreceptor G are performed in the same manner as in Example 1 except for using PTFE particles G in place of PTFE particles A. The results obtained are shown in Table 1.

Example 13

In the production of PTFE particles A of Example 1, the PTFE particles are washed so that the total amount of PFOA is 20 ppb and then treated with the fluorine-containing dispersant to produce PTFE particles, which are designated as PTFE particles H.

Subsequently, production and evaluation of PTFE composition L-H, production and evaluation of PTFE layered material F-H, and production and evaluation of electrophotographic photoreceptor H are performed in the same manner as in Example 1 except for using PTFE particles H in place of PTFE particles A. The results obtained are shown in Table 1.

Comparative Example 1

In the production of PTFE particles A of Example 1, the PTFE particles are washed so that the total amount of PFOA is 30 ppb and then treated with the fluorine-containing dispersant to produce PTFE particles, which are designated as PTFE particles E.

Subsequently, production and evaluation of PTFE composition L-E, production and evaluation of PTFE layered material F-E, and production and evaluation of electrophotographic photoreceptor E are performed in the same manner as in Example 1 except for using PTFE particles E in place of PTFE particles A. The results obtained are shown in Table 1.

Example 14

—Production of PTFE Composition L2-A—

Next, 9.5 parts by weight of Compound (I-A) represented by a structural formula shown below, 0.5 parts by weight of SUPER BECKAMINE® L-148-55 (butylated benzoguanamine resin: manufactured by Dainippon Ink and Chemicals, Inc.), 0.1 part by weight of a melamine resin (trade name: Nikalack MW-30, manufactured by Sanwa Chemical Co., Ltd.), 0.01 part by weight of polyether-modified silicone oil (trade name: KF355 (A), manufactured by Shin-Etsu Chemical Co., Ltd.), 0.1 part by weight of a blocked sulfonic acid (trade name: Nacure 5225, manufactured by Kusumoto Chemicals, Ltd.), 20 parts by weight of cyclopentanol and 5 parts by weight of 2-butanol are mixed. Further, 1 part by weight of PTFE particle A and 1 mmφ glass beads are added thereto, the mixture is subjected to dispersion treatment for 30 minutes by a paint shaker, and then the glass beads are removed. The resulting liquid is designated as PTFE composition L2-A.

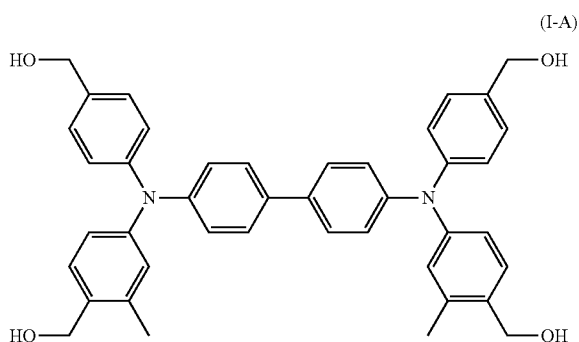 [SMILES: Cc1cc(N(c2ccc(CO)cc2)c2ccc(-c3ccc(N(c4ccc(CO)cc4)c4ccc(CO)c(C)c4)cc3)cc2)ccc1CO]

(I-A)

—Production of Electrophotographic Photoreceptor—

The same procedure as for Example 1 is performed for the production until the charge generation layer.

Next, 2 parts by weight of a benzidine compound represented by formula (CT-1) shown below and 2.5 parts by weight of a polymer compound (viscosity average molecular weight of about 80,000) having a structural unit represented by formula (B-1) shown below are dissolved in 35 parts by weight of chlorobenzene to obtain a coating solution for forming a charge transport layer.

Then, the coating solution obtained is coated on the charge generation layer described above by a dip coating method and heated at 120° C. for 40 minutes to dry, thereby forming a charge transport layer having a thickness of 23 μm.

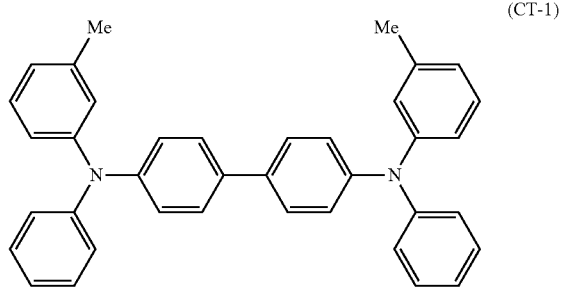

(CT-1)

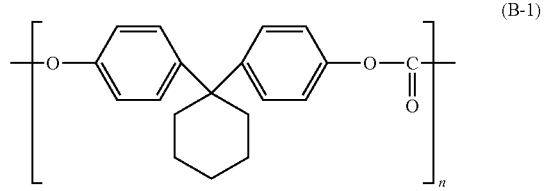

(B-1)

Next, PTFE composition L2-A is coated on the charge transport layer described above by a dip coating method, air-dried at room temperature for 10 minutes, and subjected to heat treatment at 150° C. for one hour to be cured, thereby forming a protective layer having a thickness of about 7 μm.

Thus, the desired electrophotographic photoreceptor (photoreceptor a) is obtained.

Then, the various evaluations are performed in the same manner as in Example 1.

Example 15

—Production of PTFE Composition L2-B—

6 parts by weight of Compound (III-2) represented by a structural formula shown below, 3 parts by weight of Me(MeO)$_2$—Si—(CH$_2$)$_6$—Si-Me(OMe)$_2$, 20 parts by weight of cyclopentanol and 5 parts by weight of isopropanol are mixed, and further 0.6 parts by weight of a cation exchange resin (trade name: Amberlyst 15E, manufactured by Rohm and Haas Co.) and 0.5 parts by weight of distilled water are mixed, and the mixture is subjected to hydrolysis for 30 minutes. From the hydrolyzed product the ion exchange resin is removed by filtration, and 0.2 parts by weight of aluminum trisacetylacetonate, 0.2 parts by weight of acetylacetone, 0.01 part by weight of polyether-modified silicone oil (trade name: KF355 (A), manufactured by Shin-Etsu Chemical Co., Ltd.) and 0.1 part by weight of a blocked sulfonic acid (trade name: Nacure 5225, manufactured by Kusumoto Chemicals, Ltd.) are added thereto to mix. Further, one part by weight of PTFE particle B and 1 mmφ glass beads are added thereto, the mixture is subjected to dispersion treatment for 30 minutes by a paint shaker, and then the glass beads are removed. The resulting liquid is designated as PTFE composition L2-B.

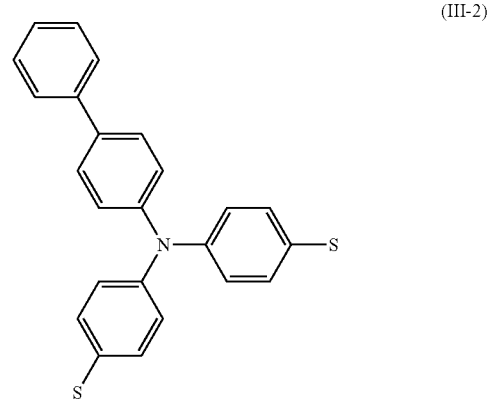 [SMILES: Sc1ccc(N(c2ccc(S)cc2)c2ccc(-c3ccccc3)cc2)cc1]

(III-2)

Here, in formula (III-2), each of S represents —(CH$_2$)$_2$—COO—(CH$_2$)$_3$—Si(O-iPr)$_2$Me. Also, Me represents a methyl group, and iPr represents an isopropyl group.

—Production of Electrophotographic Photoreceptor—

The same procedure as for Example 11 is performed for the production until the charge transfer layer.

Next, PTFE composition L2-B is coated on the charge transport layer described above by a dip coating method, air-dried at room temperature for 10 minutes, and subjected to heat treatment at 150° C. for one hour to be cured, thereby forming a protective layer having a thickness of about 5 μm.

Thus, the desired electrophotographic photoreceptor (photoreceptor b) is obtained.

Then, the various evaluations are performed in the same manner as in Example 1.

Example 16

—Production of PTFE Composition L2-C—

20 parts by weight of a compound represented by a structural formula shown below is dissolved in a mixture of 15 parts by weight of tetrahydrofuran (THF) containing no stabilizer and 15 parts by weight of cyclopentyl methyl ether, and further, one part by weight of PTFE particle C and 1 mmϕ glass beads are added thereto, the mixture is subjected to dispersion treatment for 30 minutes by a paint shaker, and then the glass beads are removed. Further, 3.8 parts by weight of an initiator (V-601, manufactured by Wako Pure Chemical Industries, Ltd.) is dissolved therein to obtain a coating solution for forming a protective layer. The resulting liquid is designated as PTFE composition L2-C.

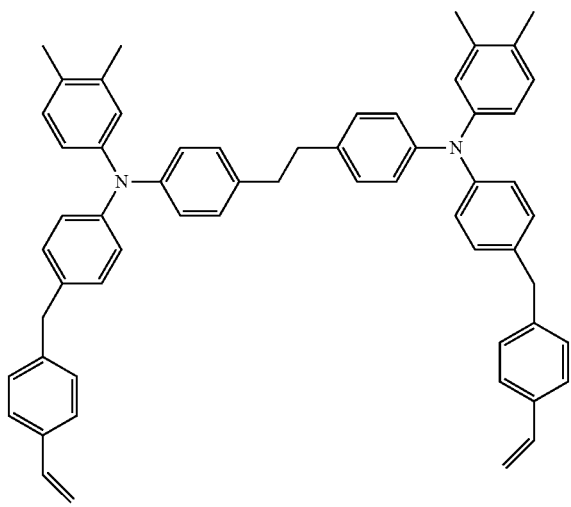 [SMILES: C=Cc1ccc(Cc2ccc(N(c3ccc(CCc4ccc(N(c5ccc(Cc6ccc(C=C)cc6)cc5)c5ccc(C)c(C)c5)cc4)cc3)c3ccc(C)c(C)c3)cc2)cc1]

—Production of Electrophotographic Photoreceptor—

The same procedure as for Example 13 is performed for the production until the charge transfer layer.

PTFE composition L2-C is coated on the charge transport layer, heated at 155° C. for 40 minutes in an atmosphere having an oxygen concentration of about 80 ppm to form a protective layer having a thickness of 7 μm.

Thus, the desired electrophotographic photoreceptor (photoreceptor c) is obtained.

Then, the various evaluations are performed in the same manner as in Example 1.

Example 4

(Production and Evaluation of Powder Coating)

A powder coating is produced in the following manner by using PTFE particles A in Example 1 as an external additive.

—Preparation of Polyester Resin and Curing Agent Composite Dispersion Liquid (E1)—

A mixed solvent of 180 parts of ethyl acetate and 80 parts of isopropyl alcohol is charged into a 3 liter-reaction vessel with a jacket (BJ-30N manufactured by Tokyo Rikakikai Co, Ltd.) which is provided with a condenser, a thermometer, a water dropping device and an anchor blade, while maintaining the reaction vessel in a water circulation type thermostatic bath at 40° C., and then, the composition described below is charged thereinto.

Polyester resin (PES1) [polycondensate of terephthalic acid/ethylene glycol/neopentyl glycol/trimethylol propane (molar ratio=100/60/38/2 (mol %), glass transition temperature=62° C., acid value (Av)=12 mgKOH/g, hydroxyl value (OHv)=55 mgKOH/g, weight average molecular weight (Mw)=12,000, number average molecular weight (Mn)=4,000]: 240 parts Blocked isocyanate curing agent (VESTAGON B 1530 manufactured by Evonik Industries AG): 60 parts Benzoin: 1.5 parts Acrylic Oligomer (ACRONAL 4F manufactured by BASF SE): 3 parts After charging the composition, the mixture is stirred at 150 rpm using a three-one motor to be dissolved, thereby preparing an oil phase. A mixed liquid of 1 part of a 10% by weight aqueous ammonia solution and 47 parts of a 5% by weight aqueous sodium hydroxide solution is dropwise added over 5 minutes to the oil phase while being stirred, mixed for 10 minutes, and then, 900 parts of ion exchange water is further dropwise added thereto at a rate of 5 parts per a minute to perform a phase inversion, thereby obtaining an emulsion liquid.

Immediately, 800 parts of the emulsion liquid obtained and 700 parts of ion exchange water are put into a 2 liter-eggplant type flask, and set in an evaporator provided with a vacuum control unit (manufactured by Tokyo Rikakikai Co, Ltd.) through a trap bulb. The eggplant type flask is heated in a hot water bath at 60° C. while being rotated, and a solvent is removed by reducing the pressure to 7 kPa while being careful of bumping. When the recovered amount of the solvent becomes 1100 parts, the pressure returns to the normal pressure (1 atom), and the eggplant type flask is cooled with water, thereby obtaining a dispersion liquid. There is no solvent odor in the dispersion liquid obtained. The volume average particle diameter of resin particles in the dispersion liquid is 145 nm. After that, an anionic surfactant (Dowfax 2A1 manufactured by The Dow Chemical Company, amount of effective component: 45% by weight) is added and mixed so that the amount of effective component thereof becomes 2% by weight with respect to the resin component in the dispersion liquid, and ion exchange water is added thereto to adjust so that a solid content concentration becomes 25% by weight The resulting dispersion liquid is designated as Polyester resin and curing agent composite dispersion liquid (E1).

—Preparation of White Pigment Dispersion Liquid (W1)

Titanium oxide (A-220 manufactured by Ishihara Sangyo Kaisha, Ltd.): 100 parts

Anionic surfactant (Neogen RK manufactured by Dai-ichi Kogyo Seiyaku Co., Ltd.): 15 parts Ion exchange water: 400 parts 0.3 mol/l Nitric acid; 4 parts The components described above are mixed and dissolved, and then dispersed using a high pressure impact dispersing machine, Altimizer (HJP 30006 manufactured by Sugino Machine Ltd.) for 3 hours to prepare a white pigment dispersion liquid having titanium oxide dispersed therein. As a result of measurement using a laser diffraction particle size distribution measuring device, a volume average particle diameter of titanium oxide in the dispersion liquid is 0.28 µm and a solid content ratio of the white pigment dispersion liquid is 25%.

—Production of White Powder Particles (PC1)—

Polyester resin and curing agent composite dispersion liquid (E1): 180 parts (solid content of 45 parts)

White pigment dispersion liquid (W1): 160 parts (solid content of 40 parts)

Ion exchange water: 200 parts

The components described above are mixed and dissolved in a stainless steel round flask by using a homogenizer (Ultra-Turrax T50 manufactured by IKA Works, Inc.). Then, the pH is adjusted to 3.5 using a 1.0% by weight aqueous nitric acid solution. 0.50 parts of a 10% by weight aqueous polyaluminum chloride solution is added thereto, and a dispersing operation is continuously performed by using Ultra-Turrax.

A stirrer and a mantle heater are disposed, the temperature is increased up to 50° C. while adjusting the number of rotations of the stirrer so that slurry is sufficiently stirred, the slurry is held at 50° C. for 15 minutes, and then the particle diameter of aggregated particles is measured by using TA-II type Coulter Counter (manufactured by Beckman Coulter, Inc., aperture diameter: 50 µm), and when the volume average particle diameter becomes 5.5 µm, 60 parts of Polyester resin and curing agent composite dispersion liquid (E1) is slowly charged into the flask as a shell (charge of shell).

The flask is held for 30 minutes after the charge of shell and then, pH is set to 7.0 using a 5% aqueous sodium hydroxide solution. After that, the temperature is increased up to 85° C. and is held for 2 hours.

After the completion of the reaction, the solution in the flask is cooled and filtered to obtain a solid content. Then, the solid content is washed with ion exchange water, and subjected to solid liquid separation by Nutsche type suction filtration to obtain a solid content again.

Subsequently, the solid content is dispersed again in 3 liters of ion exchange water at 40° C., and is stirred and washed at 300 rpm for 15 minutes. The washing operation is repeated 5 times, the solid content obtained by performing solid liquid separation by Nutsche type suction filtration is subjected to vacuum drying for 12 hours to obtain White powder particles (PC1) of a core shell type.

As a result of measurement of a particle diameter of White powder particles (PC1), the volume average particle diameter D50v is 6.8 µm, the volume particle diameter distribution index GSDv is 1.24, and the average circularity is 0.97.

—Production of White Powder Coating—

100 parts of White powder particles (PC1), 0.6 parts of silica particles (Aerosil RX200 manufactured by Nippon Aerosil Co., Ltd.) as an external additive and 3 parts of the dispersant attached PTFE particles of each of the examples as an external additive are mixed by using a Henschel mixer at a peripheral speed of 32 m/s for 10 minutes, and then coarse particles are removed by using a sieve having a mesh size of 45 µm to obtain a white powder coating.

—Evaluation—

Using the white powder coating obtained, the evaluation described below are performed.

The powder coating is put into a corona gun XR4-110C manufactured by Asahi Sunac Corp.

The corona gun XR4-110C manufactured by Asahi Sunac Corp. is vertically and horizontally slid with respect to a square test panel (an object to be coated) of 30 cm×30 cm of a mirror finished aluminum plate by a distance of 30 cm from the panel front surface (a distance between the panel and a discharge port of the corona gun) to discharge the powder coating material and to be electrostatically attached to the panel, thereby forming an attached layer. The applied voltage of the corona gun is set to 80 kV, the input air pressure is set to 0.55 MPa, the discharge amount is set to 200 g/minute, and the attachment amount of the powder coating attached to the panel is set to 50 g/m$^2$, 90 g/m$^2$, 180 g/m$^2$ or 220 g/m$^2$ to perform the coatings of four times.

Subsequently, each panel is put into a high temperature chamber set to 180° C. and heated (baked) for 30 minutes.

The coating film obtained is evaluated by palpation and visual observation. The evaluation criteria are as shown below.

A: No problem is recognized by the palpation and the visual observation.

B: Slight unevenness is recognized by the visual observation. (level without any problem)

C: Protrusion is recognized by the palpation. (level without any problem)

D: Unevenness is recognized by the visual observation and Protrusion is recognized by the palpation.

Examples 5 and 6, and Comparative Example 2

(Production and Evaluation of Powder Coating)

The powder coatings are produced and evaluated in the same manner as in Example 4, except for using PTFE particles B to E in Examples 2 and 3 and Comparative Example 1.

The examples described above are shown as a list in Table 1 and Table 2.

TABLE 1

| | Dispersant Attached PTFE Particle | | Liquid PTFE Composition | | Layered PTFE Composition | | Electrophotographic Photoreceptor | | | | |
|---|---|---|---|---|---|---|---|---|---|---|---|
| | | | Evaluation | | | | | Evaluation | | | |
| | Name | Evaluation PFOA Content | Name | Average Particle Diameter | Name | Average Particle Diameter | Name | Image Quality of 1$^{st}$ Sheet | Image Quality of 100$^{st}$ Sheet | Image Quality of 5,000$^{th}$ Sheet | Image Quality of 10,000$^{th}$ Sheet |
| Example 2 | PTFE Particle B | 0 ppb | PTFE Composition L-B | 0.21 | PTFE Composition F-B | 0.22 | Electrophotographic Photoreceptor B | A | A | B | B |

TABLE 1-continued

| | Dispersant Attached PTFE Particle | | Liquid PTFE Composition | | Layered PTFE Composition | | Electrophotographic Photoreceptor | | | | |
|---|---|---|---|---|---|---|---|---|---|---|---|
| | | | | Evaluation Average Particle Diameter | | Evaluation Average Particle Diameter | | Evaluation | | | |
| Name | Name | Evaluation PFOA Content | Name | | Name | | Name | Image Quality of 1st Sheet | Image Quality of 100st Sheet | Image Quality of 5,000th Sheet | Image Quality of 10,000th Sheet |
| Example 10 | PTFE Particle D | 0.01 ppb | PTFE Composition L-D | 0.22 | PTFE Composition F-D | 0.23 | Electrophotographic Photoreceptor D | A | A | A | B |
| Example 11 | PTFE Particle F | 0.1 ppb | PTFE Composition L-F | 0.22 | PTFE Composition F-F | 0.23 | Electrophotographic Photoreceptor F | A | A | A | B |
| Example 1 | PTFE Particle A | 5 ppb | PTFE Composition L-A | 0.22 | PTFE Composition F-A | 0.23 | Electrophotographic Photoreceptor A | A | A | A | B |
| Example 12 | PTFE Particle G | 15 ppb | PTFE Composition L-G | 0.22 | PTFE Composition F-G | 0.23 | Electrophotographic Photoreceptor G | A | A | A | B |
| Example 13 | PTFE Particle H | 20 ppb | PTFE Composition L-H | 0.22 | PTFE Composition F-H | 0.23 | Electrophotographic Photoreceptor H | A | A | A | B |
| Example 3 | PTFE Particle C | 25 ppb | PTFE Composition L-C | 0.22 | PTFE Composition F-C | 0.24 | Electrophotographic Photoreceptor C | A | A | B | B |
| Comparative Example 1 | PTFE Particle E | 30 ppb | PTFE Composition L-E | 0.25 | PTFE Composition F-E | 0.35 | Electrophotographic Photoreceptor E | C | D | D | D |
| Example 14 | PTFE Particle A | 5 ppb | PTFE Composition L2-A | 0.22 | PTFE Composition F2-A | 0.23 | Electrophotographic Photoreceptor a | A | A | A | A |
| Example 15 | PTFE Particle B | 0 ppb | PTFE Composition L2-B | 0.21 | PTFE Composition F2-B | 0.23 | Electrophotographic Photoreceptor b | A | A | A | A |
| Example 16 | PTFE Particle C | 25 ppb | PTFE Composition L2-C | 0.22 | PTFE Composition F2-C | 0.23 | Electrophotographic Photoreceptor c | A | A | A | A |

TABLE 2

| | | Evaluation |
|---|---|---|
| Example 4 | PTFE particle A | A |
| Example 5 | PTFE particle B | A |
| Example 6 | PTFE particle C | B |
| Comparative Example 2 | PTFE particle E | D |

From the results shown above, it can be seen that in the examples, the satisfactory results are obtained in both the evaluation of photoreceptor and the evaluation of powder coating in comparison with in the comparative examples.

Therefore, it can be understood that the PTFE particle dispersion liquid (and the dispersant attached PTFE particle) according to the exemplary embodiment have high maintainability of dispersion state, even when the state of the component mixed changes.

What is claimed is:

1. A dispersant attached polytetrafluoroethylene particle comprising:
a polytetrafluoroethylene particle, and
a dispersant having a fluorine atom, wherein:
the dispersant is attached to a surface of the polytetrafluoroethylene particle,
a content of perfluorooctanoic acid is from 0.01 ppb to 25 ppb with respect to the dispersant attached polytetrafluoroethylene particle, and
the dispersant is a fluorinated alkyl group-containing polymer having a structural unit represented by the following formula (FA) and a structural unit represented by the following formula (FB):

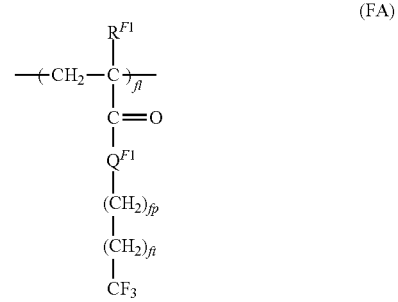

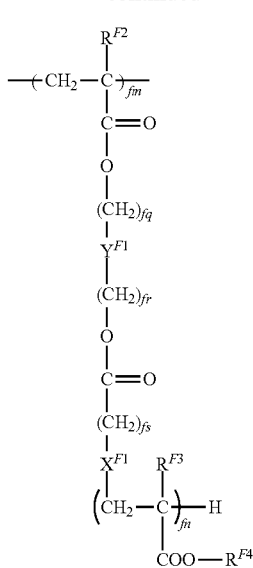

wherein, in the formulae (FA) and (FB):

each of $R^{F1}$, $R^{F2}$, $R^{F3}$ and $R^{F4}$ independently represents a hydrogen atom or an alkyl group;

$X^{F1}$ represents an alkylene chain, a halogen-substituted alkylene chain, —S—, —O—, —NH— or a single bond;

$Y^{F1}$ represents an alkylene chain, a halogen-substituted alkylene chain, —$C_{fx}H_{2fx-1}$(OH)— or a single bond;

$Q^{F1}$ represents —O— or —NH—;

each of fl, fm and fn independently represents an integer of 1 or more;

each of fp, fq, fr and fs independently represents 0 or an integer of 1 or more;

ft represents an integer of 1 to 7; and fx represents an integer of 1 or more.

2. The dispersant attached polytetrafluoroethylene particle as claimed in claim 1, wherein the dispersant attached polytetrafluoroethylene particle has an average particle diameter of from 0.2 μm to 4.5 μm.

3. The dispersant attached polytetrafluoroethylene particle as claimed in claim 1, wherein a content of the dispersant having a fluorine atom is from 0.5% by weight to 10% by weight with respect to the polytetrafluoroethylene particle.

4. The dispersant attached polytetrafluoroethylene particle as claimed in claim 3, wherein the content of the dispersant having a fluorine atom is from 1% by weight to 7% by weight with respect to the polytetrafluoroethylene particle.

5. A composition comprising the dispersant attached polytetrafluoroethylene particle as claimed in claim 1.

6. The composition as claimed in claim 5, wherein an average particle diameter of the dispersant attached polytetrafluoroethylene particle is from 0.2 μm to 4.5 μm.

7. The composition as claimed in claim 5, wherein the composition is in a liquid state or in a solid state.

8. The composition as claimed in claim 5, wherein a content of the dispersant having a fluorine atom is from 0.5% by weight to 10% by weight with respect to the polytetrafluoroethylene particle.

9. The composition as claimed in claim 8, wherein the content of the dispersant having a fluorine atom is from 1% by weight to 7% by weight with respect to the polytetrafluoroethylene particle.

10. A layered material comprising the dispersant attached polytetrafluoroethylene particle as claimed in claim 1.

11. The layered material as claimed in claim 10, wherein an average particle diameter of the dispersant attached polytetrafluoroethylene particle is from 0.2 μm to 4.5 μm.

12. The layered material as claimed in claim 10, wherein a content of the dispersant having a fluorine atom is from 0.5% by weight to 10% by weight with respect to the polytetrafluoroethylene particle.

13. The layered material as claimed in claim 12, wherein the content of the dispersant having a fluorine atom is from 1% by weight to 7% by weight with respect to the polytetrafluoroethylene particle.

14. An electrophotographic photoreceptor comprising a conductive substrate and a photosensitive layer, wherein an outermost surface layer of the electrophotographic photoreceptor is a layer comprising the layered material as claimed in claim 10.

15. The electrophotographic photoreceptor as claimed in claim 14, wherein the outermost surface layer is a surface protective layer having a crosslinked structure.

16. A process cartridge comprising the electrophotographic photoreceptor as claimed in claim 15, wherein the process cartridge is detachably attached to an image forming apparatus.

17. An image forming apparatus comprising:
the electrophotographic photoreceptor as claimed in claim 15,
a charging unit that charges a surface of the electrophotographic photoreceptor,
an electrostatic latent image forming unit that forms an electrostatic latent image on the charged surface of the electrophotographic photoreceptor,
a developing unit that develops the electrostatic latent image formed on the surface of the electrophotographic photoreceptor using a developer containing a toner to form a toner image, and
a transfer unit that transfers the toner image to a surface of a recording medium.

18. A process cartridge comprising the electrophotographic photoreceptor as claimed in claim 14, wherein the process cartridge is detachably attached to an image forming apparatus.

19. An image forming apparatus comprising:
the electrophotographic photoreceptor as claimed in claim 14,
a charging unit that charges a surface of the electrophotographic photoreceptor,
an electrostatic latent image forming unit that forms an electrostatic latent image on the charged surface of the electrophotographic photoreceptor,
a developing unit that develops the electrostatic latent image formed on the surface of the electrophotographic photoreceptor using a developer containing a toner to form a toner image, and
a transfer unit that transfers the toner image to a surface of a recording medium.

20. A dispersant attached polytetrafluoroethylene particle comprising:

a polytetrafluoroethylene particle, and a dispersant having a fluorine atom, wherein:

the dispersant is attached to a surface of the polytetrafluoroethylene particle, a content of perfluorooctanoic acid is from 0 ppb to 25 ppb with respect to the dispersant attached polytetrafluoroethylene particle, and the dispersant is a fluorinated alkyl group-containing polymer having a structural unit represented by the following formula (FA) and a structural unit represented by the following formula (FB):

$$\begin{array}{c} R^{F1} \\ | \\ -(CH_2-C)_{fl}- \\ | \\ C=O \\ | \\ Q^{F1} \\ | \\ (CH_2)_{fp} \\ | \\ (CH_2)_{fi} \\ | \\ CF_3 \end{array} \quad (FA)$$

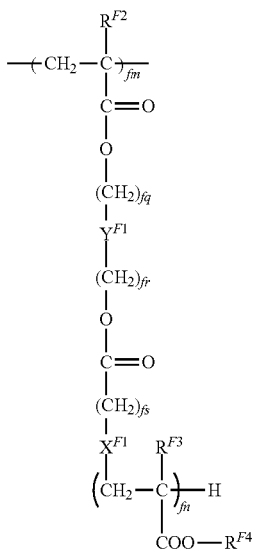

(FB)

wherein, in the formulae (FA) and (FB):

each of $R^{F1}$, $R^{F2}$, $R^{F3}$ and $R^{F4}$ independently represents a hydrogen atom or an alkyl group;

$X^{F1}$ represents an alkylene chain, a halogen-substituted alkylene chain, —S—, —O—, —NH— or a single bond;

$Y^{F1}$ represents an alkylene chain, a halogen-substituted alkylene chain, —$C_{fx}H_{2fx-1}$(OH))— or a single bond;

$Q^{F1}$ represents —O— or —NH—;

each of fl, fm and fn independently represents an integer of 1 or more;

each of fp, fq, fr and fs independently represents 0 or an integer of 1 or more;

ft represents an integer of 1 to 7; and fx represents an integer of 1 or more.

* * * * *